(12) United States Patent
Blum et al.

(10) Patent No.: US 10,583,847 B2
(45) Date of Patent: Mar. 10, 2020

(54) RAISABLE CARRYING DEVICE

(71) Applicants: Kaessbohrer Transport Technik GmbH, Eugendorf (AT); Franz Blum, Salzburg (AT)

(72) Inventors: Franz Blum, Salzburg (AT); Horst Foessl, Elsbethen (AT)

(73) Assignees: KAESSBOHRER TRANSPORT TECHNIK GMBH, Eugendorf (AT); Franz Blum, Salzburg (AT)

( * ) Notice: Subject to any disclaimer, the term of this patent is extended or adjusted under 35 U.S.C. 154(b) by 0 days.

(21) Appl. No.: 15/699,520

(22) Filed: Sep. 8, 2017

(65) Prior Publication Data

US 2018/0009451 A1    Jan. 11, 2018

Related U.S. Application Data

(63) Continuation of application No. PCT/AT2016/050056, filed on Mar. 10, 2016.

(30) Foreign Application Priority Data

Mar. 11, 2015   (AT) .................................. A 132/2015

(51) Int. Cl.
| | | |
|---|---|---|
| *B61D 47/00* | (2006.01) | |
| *B61D 3/04* | (2006.01) | |
| *B61D 3/08* | (2006.01) | |
| *B61D 3/18* | (2006.01) | |
| *B65G 63/02* | (2006.01) | |

(52) U.S. Cl.
CPC ............. *B61D 47/005* (2013.01); *B61D 3/04* (2013.01); *B61D 3/08* (2013.01); *B61D 3/184* (2013.01); *B65G 63/025* (2013.01); *B65D 2585/6867* (2013.01)

(58) Field of Classification Search
CPC ..... B65D 19/44; B65D 88/121; B65D 88/127
USPC ............ 220/1.5; 108/51.11, 55.1, 55.3, 55.5, 108/54.1
See application file for complete search history.

(56) References Cited

U.S. PATENT DOCUMENTS 3,163,127 A * 12/1964 Gutridge ................... B60P 7/13
                                                     105/392.5
3,802,357 A *  4/1974 Shahani ............... B65D 88/129
                                                     108/53.5
(Continued)

FOREIGN PATENT DOCUMENTS

| CN | 102395501 | 3/2012 |
| CN | 103140375 | 6/2013 |

(Continued)

OTHER PUBLICATIONS

International Search Report dated Jul. 8, 2016 in International (PCT) Application No. PCT/AT2015/050056.

(Continued)

*Primary Examiner* — Jose V Chen
(74) *Attorney, Agent, or Firm* — Wenderoth, Lind & Ponack, L.L.P.

(57) ABSTRACT

A raisable carrying device for loading cargo onto a rail vehicle using a hoisting unit. The carrying device includes at least one supporting unit for the cargo, holding pockets for the hoisting unit, and support surfaces for placing the carrying device directly on the floor of a terminal.

22 Claims, 46 Drawing Sheets

(56) References Cited

U.S. PATENT DOCUMENTS

| | | | | |
|---|---|---|---|---|
| 4,024,820 A | * | 5/1977 | Hlinsky | B60P 3/073 410/3 |
| 4,611,962 A | * | 9/1986 | Braly | B65D 90/0006 280/33.998 |
| 4,693,651 A | * | 9/1987 | Stuart | B60P 3/07 188/32 |
| 4,917,557 A | * | 4/1990 | Kato | B60P 3/08 108/53.1 |
| 5,127,781 A | * | 7/1992 | Roarty | B60P 3/42 108/55.1 |
| 5,213,458 A | | 5/1993 | Preller et al. | |
| 5,222,443 A | | 6/1993 | Engle | |
| 5,355,813 A | * | 10/1994 | Darnell | B65D 19/42 108/55.3 |
| 5,478,189 A | * | 12/1995 | Agtuca | B60P 1/52 414/345 |
| 5,706,738 A | * | 1/1998 | Rapeli | B63B 25/22 108/54.1 |
| 5,890,855 A | | 4/1999 | Claps | |
| 6,109,853 A | * | 8/2000 | Paulmichl | E04H 6/282 414/239 |
| 6,224,307 B1 | * | 5/2001 | Johnson | B63B 25/24 410/132 |
| 6,352,400 B1 | | 3/2002 | Forbes | |
| 6,513,442 B1 | * | 2/2003 | Miller | B65D 88/022 108/53.1 |
| 6,682,280 B1 | * | 1/2004 | Lindsay | B62D 21/12 410/100 |
| 7,726,247 B2 | * | 6/2010 | Neland | E04H 6/225 108/55.1 |
| 7,918,165 B2 | * | 4/2011 | Owen | B65D 19/385 108/55.1 |
| 8,262,328 B2 | | 9/2012 | Crane et al. | |
| 8,342,784 B2 | | 1/2013 | Crane et al. | |
| 8,353,647 B2 | | 1/2013 | Crane et al. | |
| 8,608,415 B2 | | 12/2013 | Crane et al. | |
| 8,667,902 B2 | | 3/2014 | Linde | |
| 8,678,727 B2 | | 3/2014 | Crane | |
| 8,714,895 B2 | * | 5/2014 | Crane | B65D 88/129 410/46 |
| 8,757,943 B2 | | 6/2014 | Crane et al. | |
| 8,925,470 B2 | * | 1/2015 | Hart | F16M 3/00 108/55.1 |
| 9,227,756 B2 | | 1/2016 | Crane et al. | |
| 2003/0017020 A1 | | 1/2003 | Sain | |
| 2008/0250986 A1 | * | 10/2008 | Boon | B65D 88/005 108/53.1 |
| 2009/0050031 A1 | * | 2/2009 | Cai | B65D 19/44 108/55.5 |
| 2010/0135742 A1 | * | 6/2010 | Sain | B65D 88/12 410/46 |
| 2012/0017799 A1 | | 1/2012 | Linde | |
| 2012/0074012 A1 | | 3/2012 | Crane | |
| 2012/0076603 A1 | | 3/2012 | Crane et al. | |
| 2012/0076604 A1 | | 3/2012 | Crane et al. | |
| 2012/0076605 A1 | | 3/2012 | Crane et al. | |
| 2012/0076607 A1 | | 3/2012 | Crane et al. | |
| 2013/0075294 A2 | | 3/2013 | Crane | |
| 2013/0089387 A1 | | 4/2013 | Crane et al. | |
| 2013/0092060 A1 | | 4/2013 | Crane et al. | |
| 2013/0125796 A1 | * | 5/2013 | Crane | B61D 47/00 108/55.1 |
| 2014/0133952 A1 | * | 5/2014 | Carling | B65D 19/0073 414/800 |
| 2015/0266612 A1 | * | 9/2015 | Ma | B65D 88/005 108/54.1 |

FOREIGN PATENT DOCUMENTS

| | | |
|---|---|---|
| CN | 104386075 | 3/2015 |
| DE | 44 29 710 | 2/1996 |
| DE | 197 82 025 | 8/2000 |
| DE | 200 23 310 | 4/2004 |
| DE | 10 2006 012 208 | 9/2007 |
| EP | 0 768 226 | 4/1997 |
| EP | 1 010 600 | 6/2000 |
| EP | 1 712 444 | 10/2006 |
| FR | 2 850 929 | 8/2004 |
| FR | 2 884 479 | 10/2006 |
| FR | 2 965 257 | 3/2012 |
| RU | 2374107 | 11/2009 |
| WO | 81/02142 | 8/1981 |
| WO | 01/72593 | 10/2001 |
| WO | 01/98129 | 12/2001 |
| WO | 02/055359 | 7/2002 |
| WO | 03/076246 | 9/2003 |

OTHER PUBLICATIONS

Nikrasa, "Non-crane-able semi-trailers become crane-able", http://www.nikrasa.eu/en/home.html, accessed Aug. 28, 2017.

M. Baier et al., "CargoBeamer—new era in freight traffic", Zevrail-Glasers Annalen, Georg Siemens Verlag, Berlin, DE, vol. 135, No. 6-7 Jun. 1, 2011, pp. 240-245, with English abstract (as well as cited in specification).

Search Report dated Sep. 12, 2018 in Chinese Application No. 2016800236492.

* cited by examiner

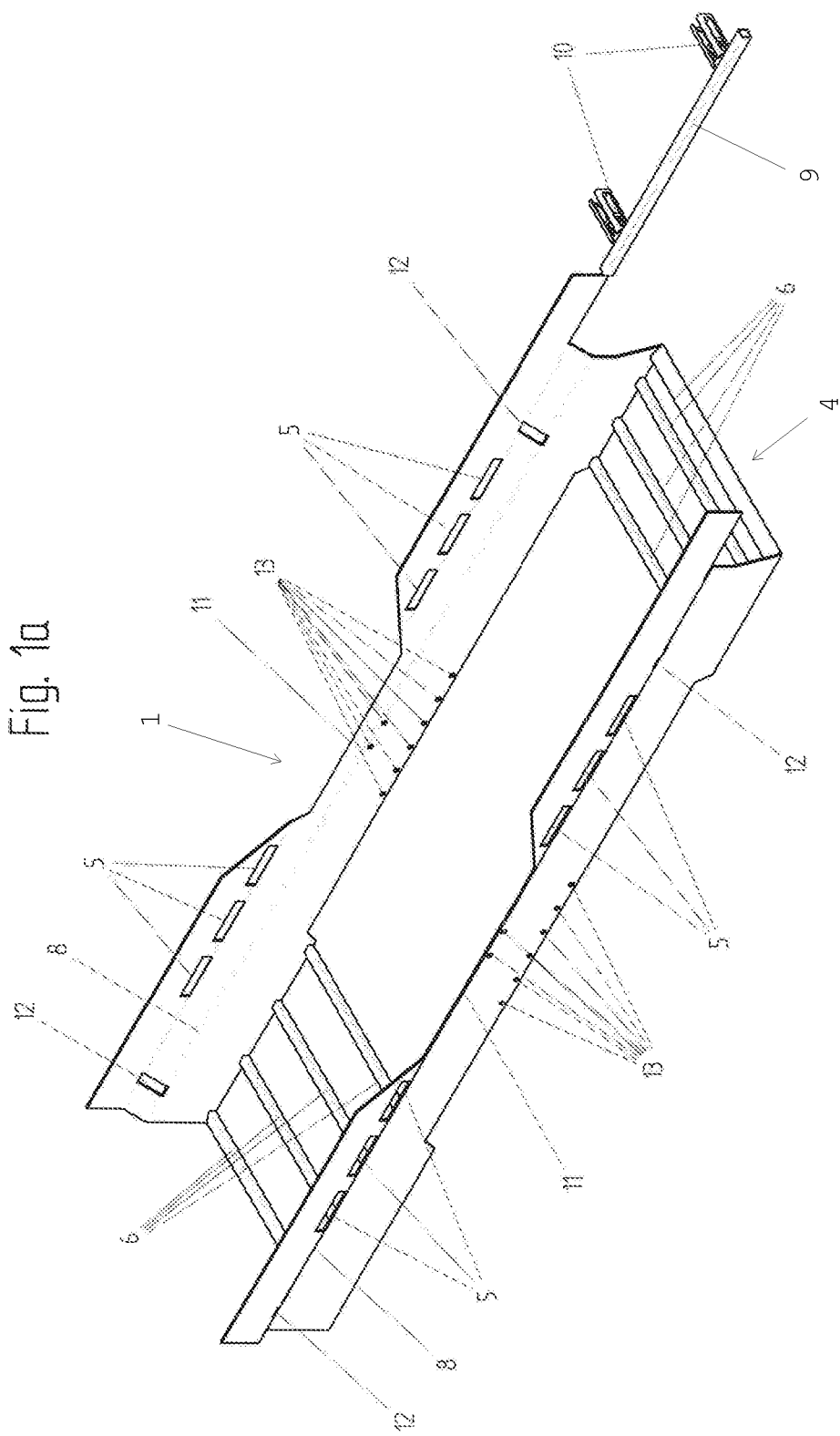

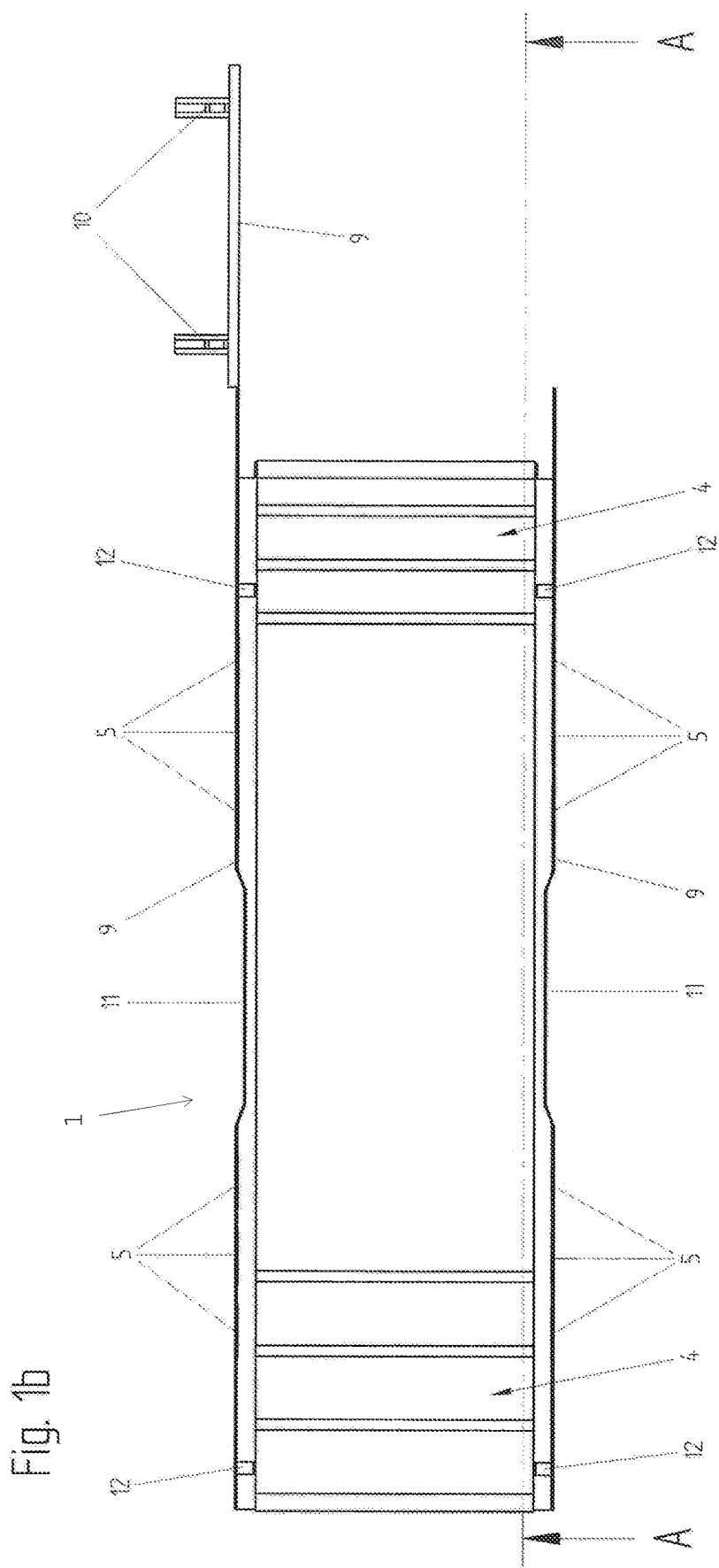

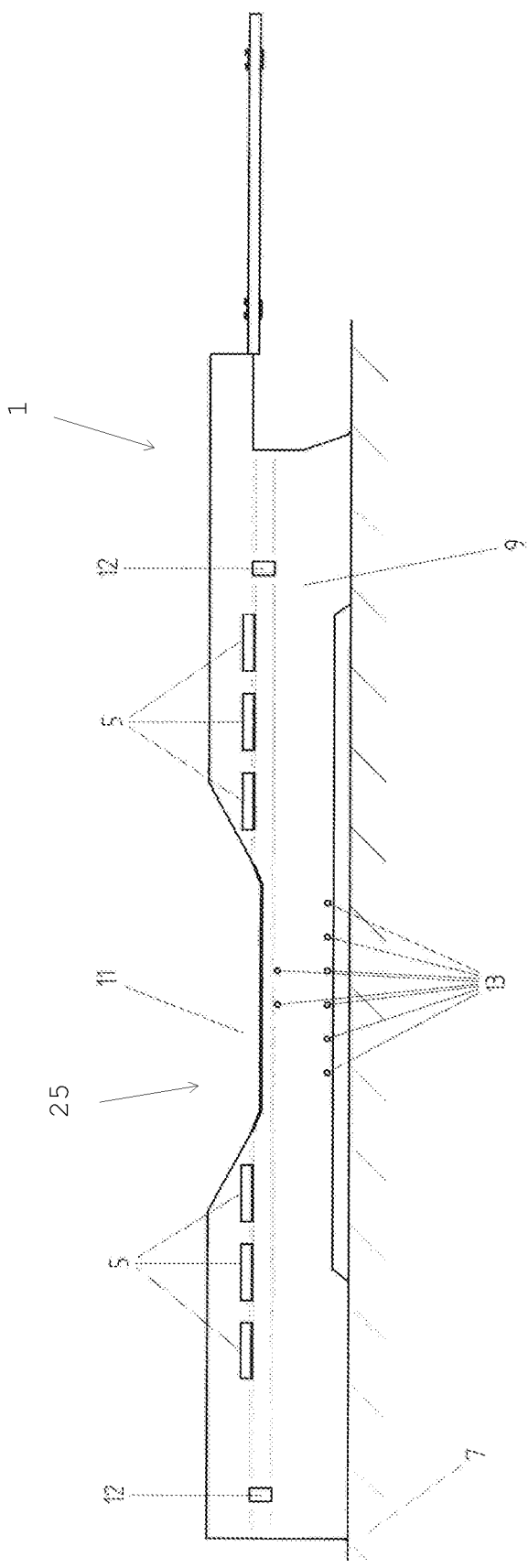

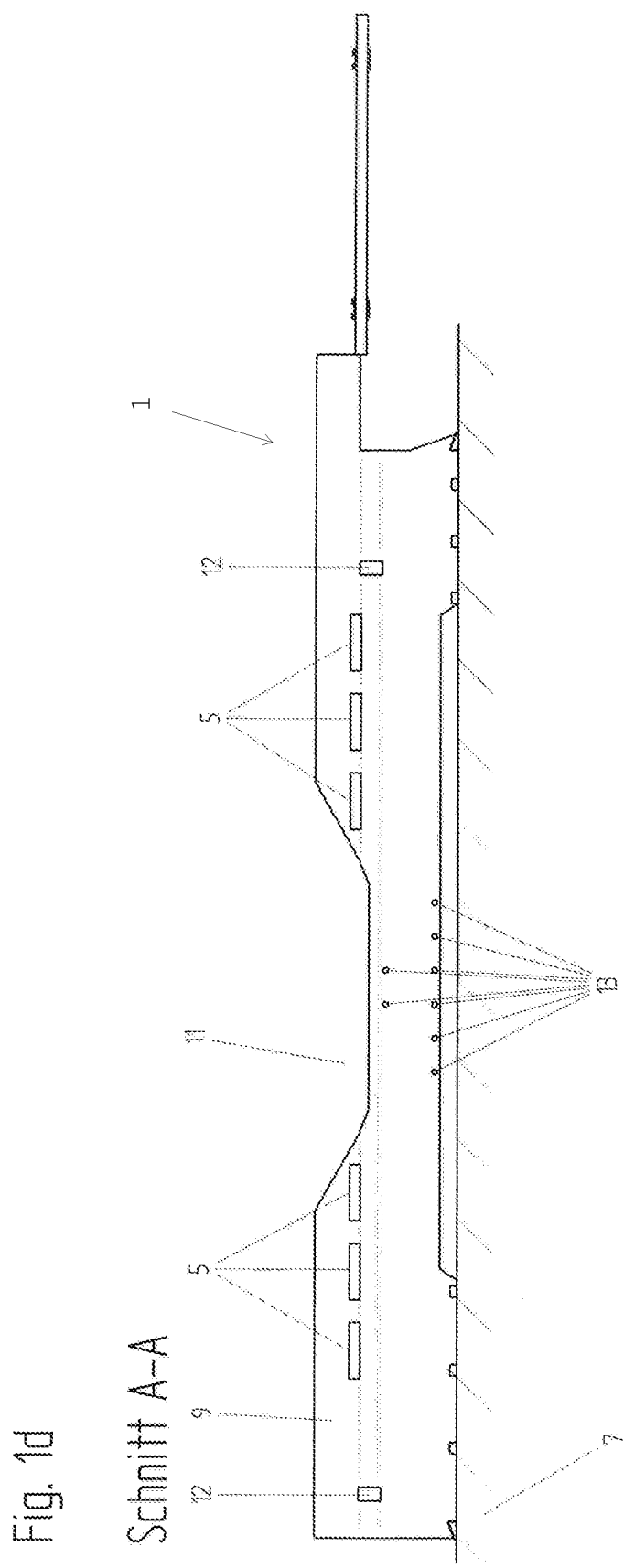

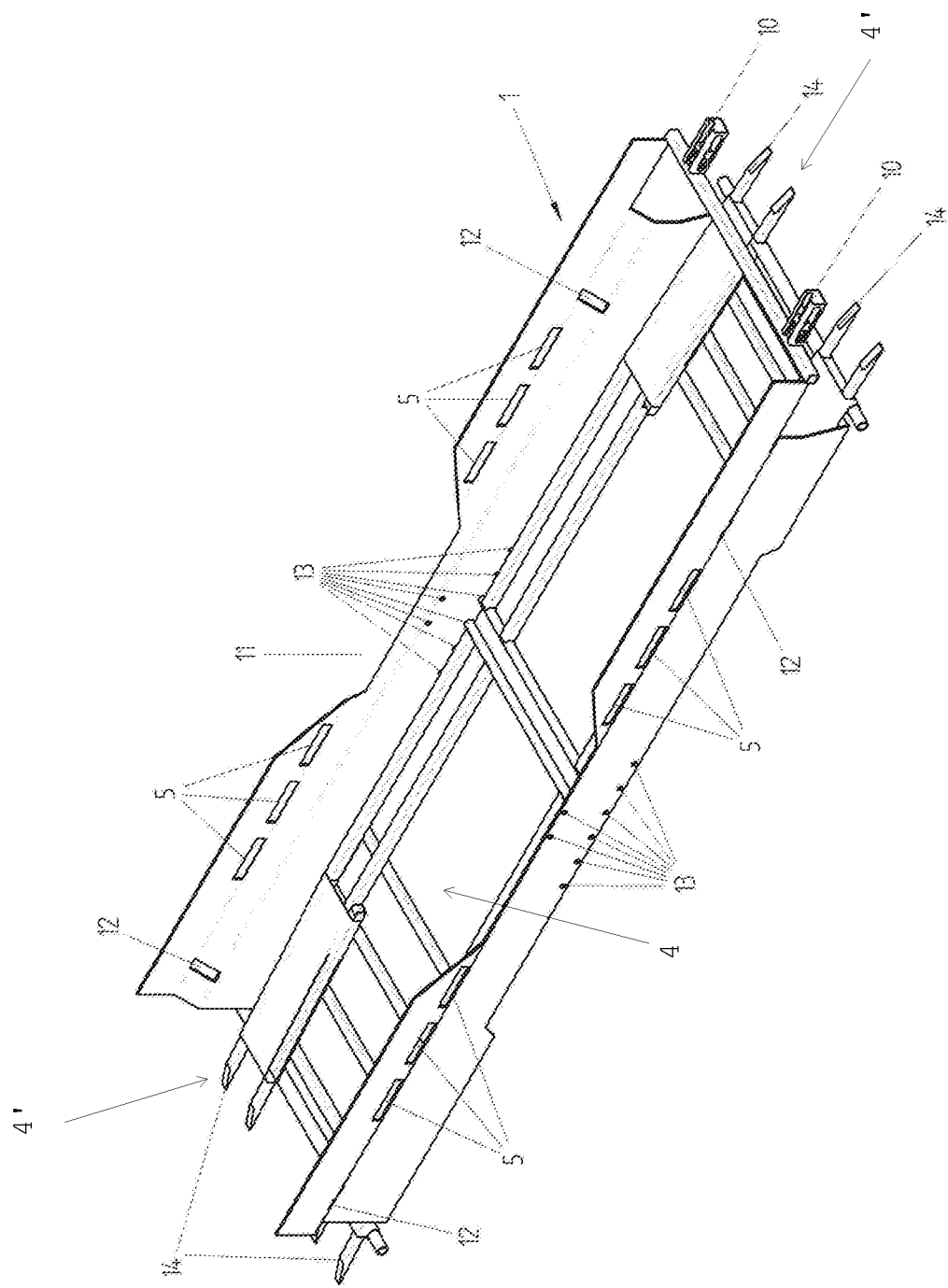

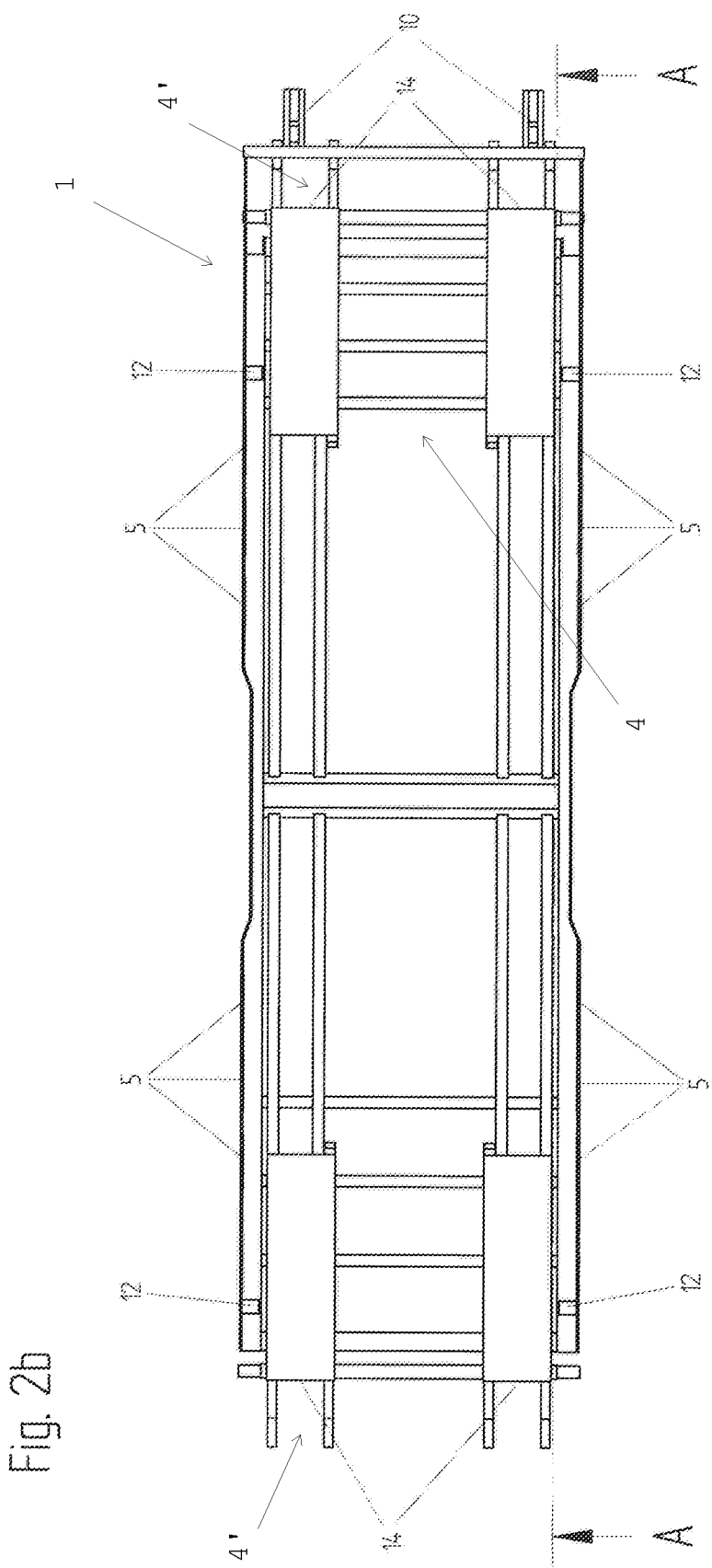

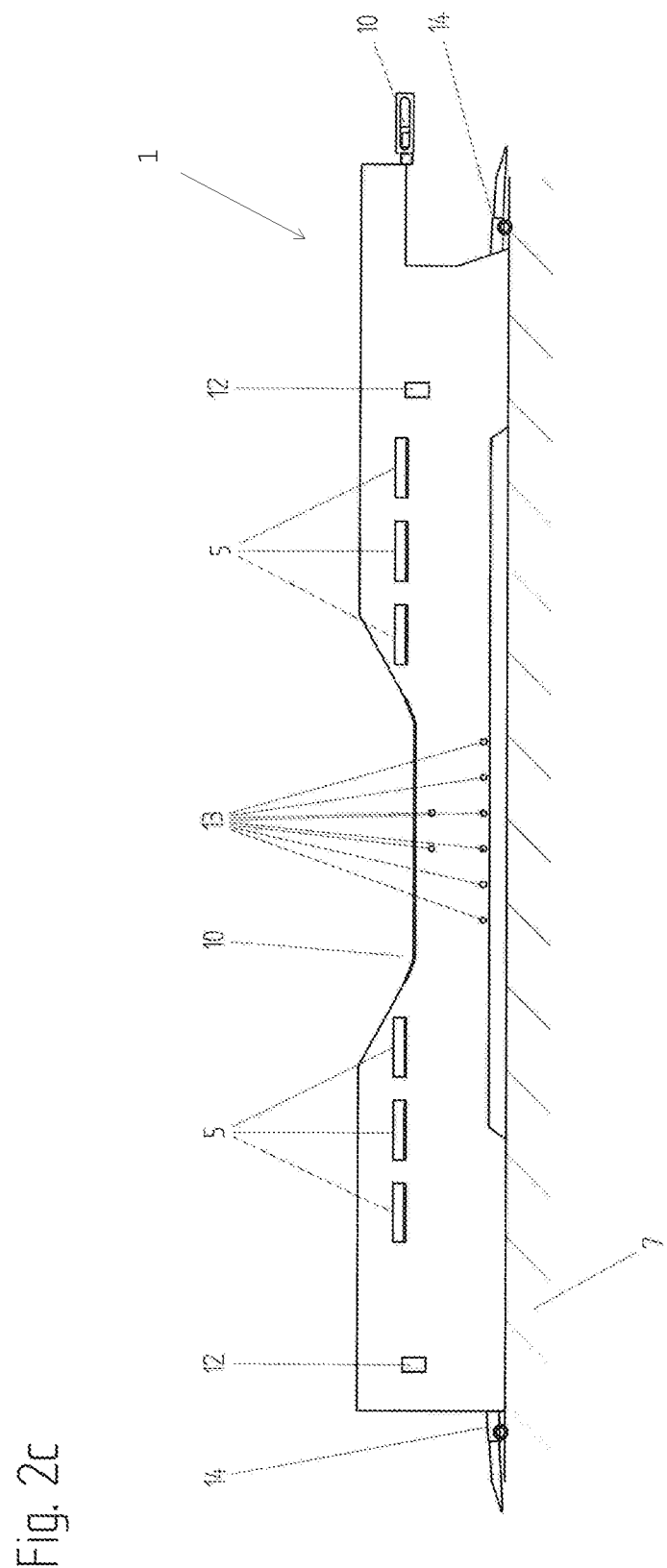

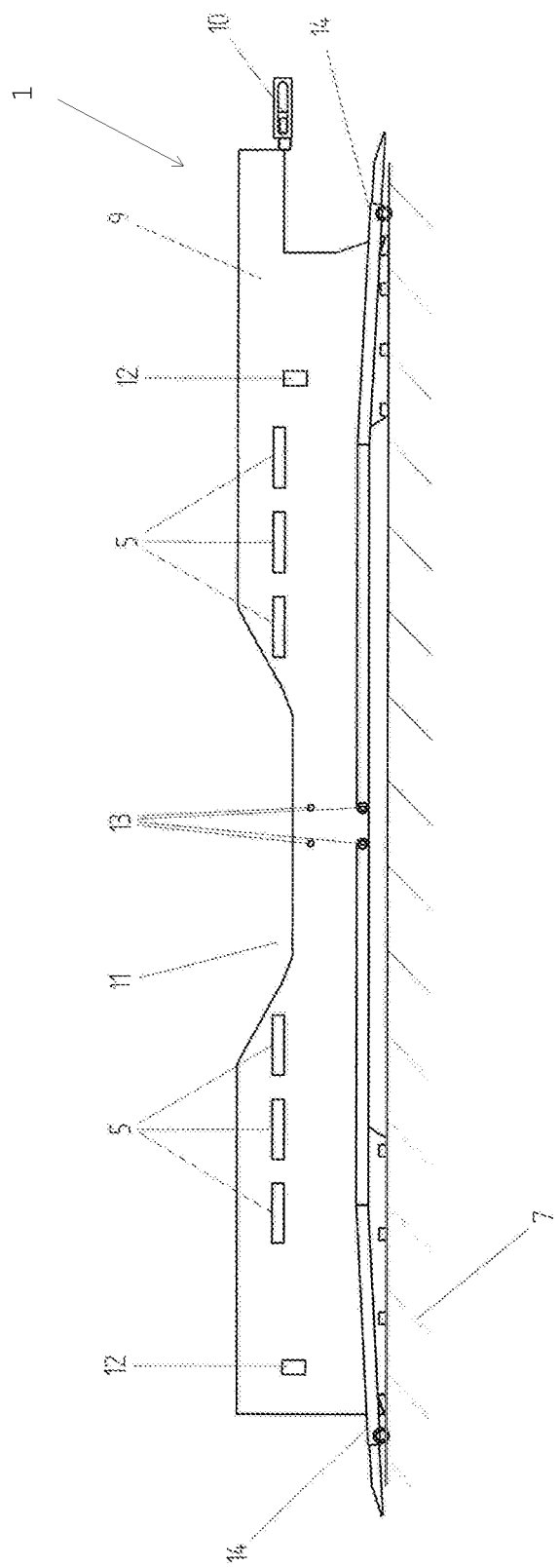

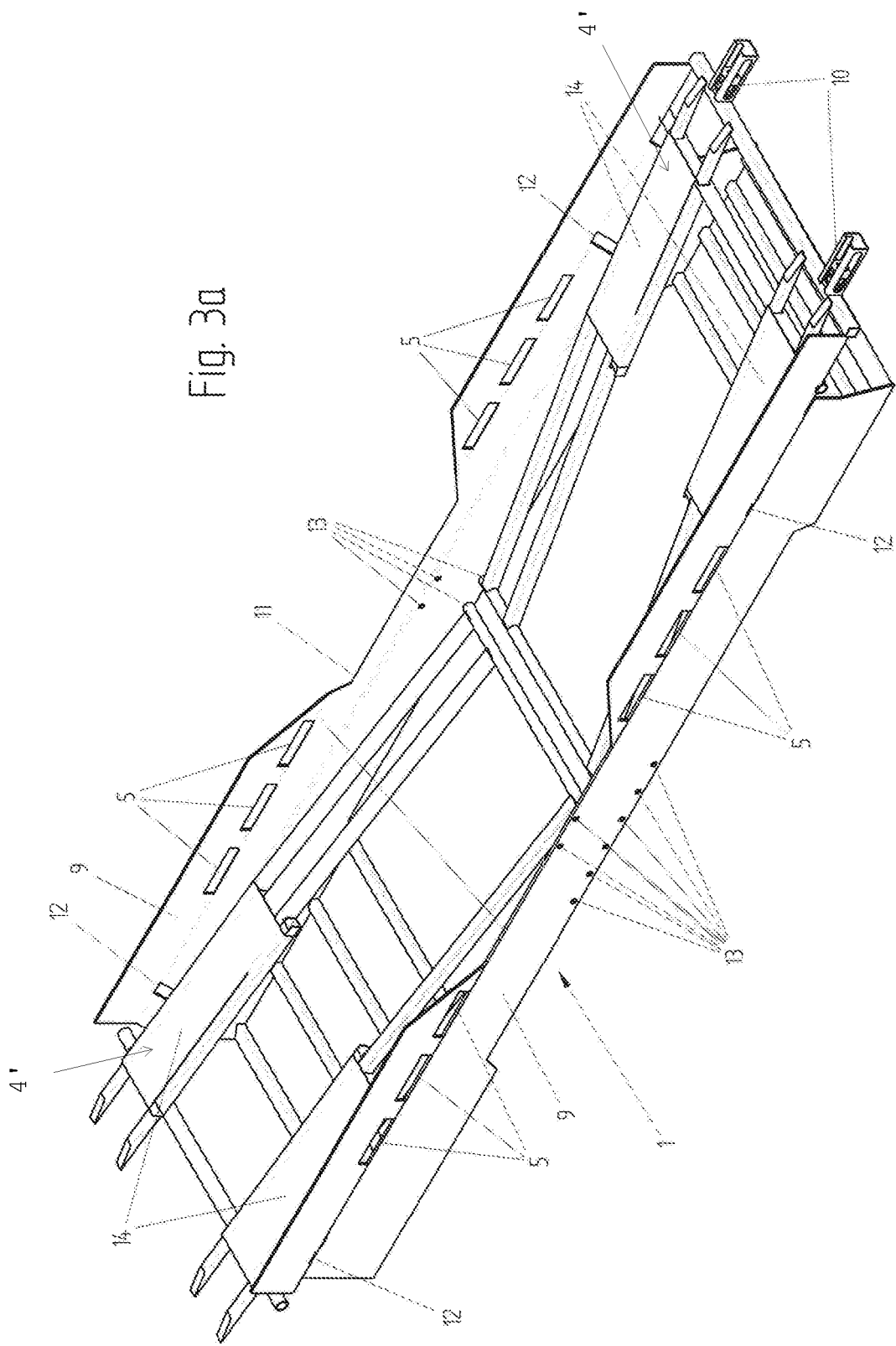

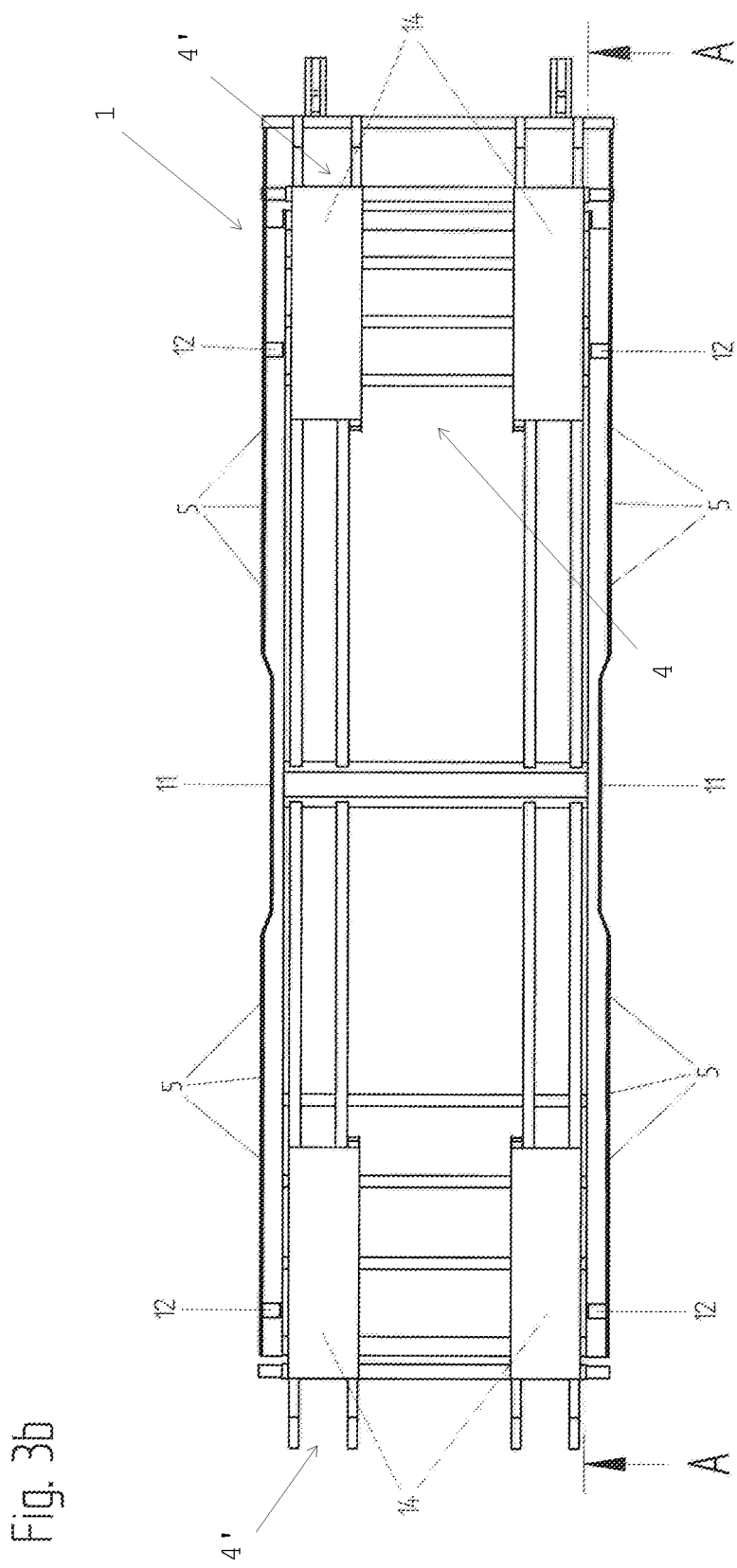

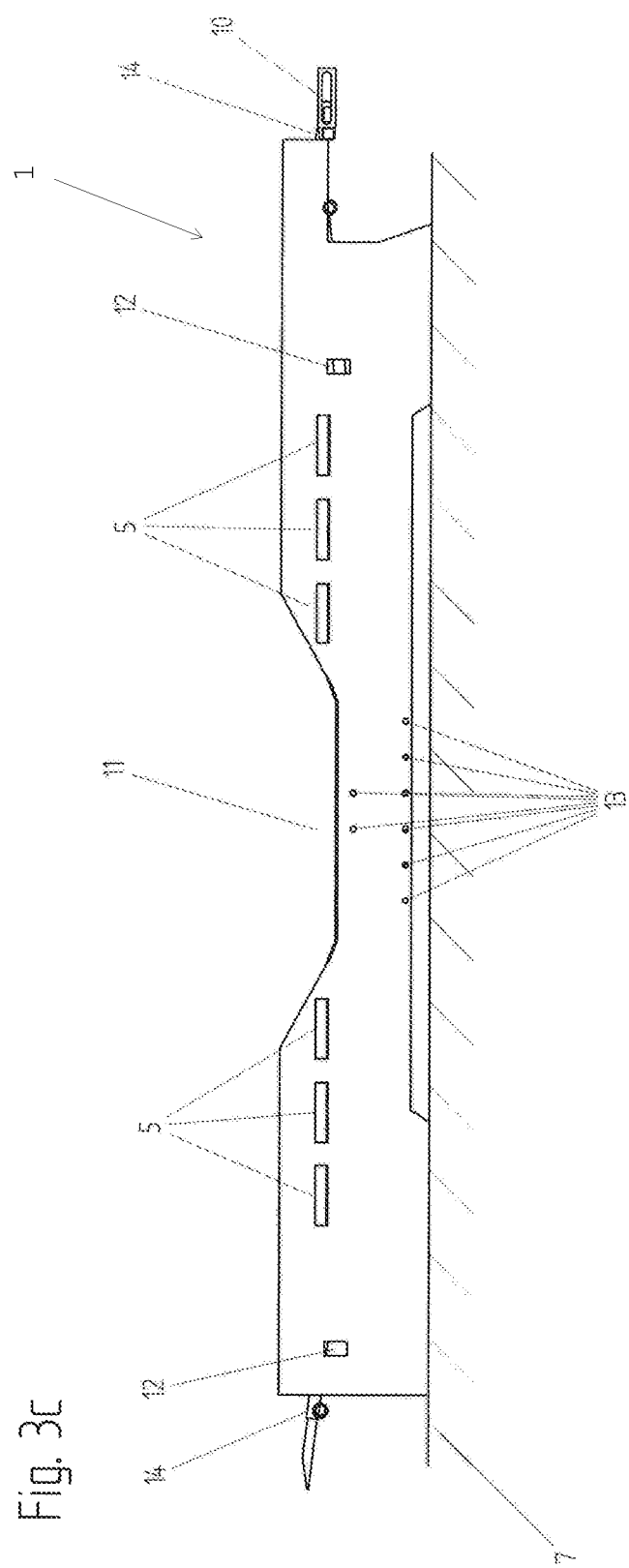

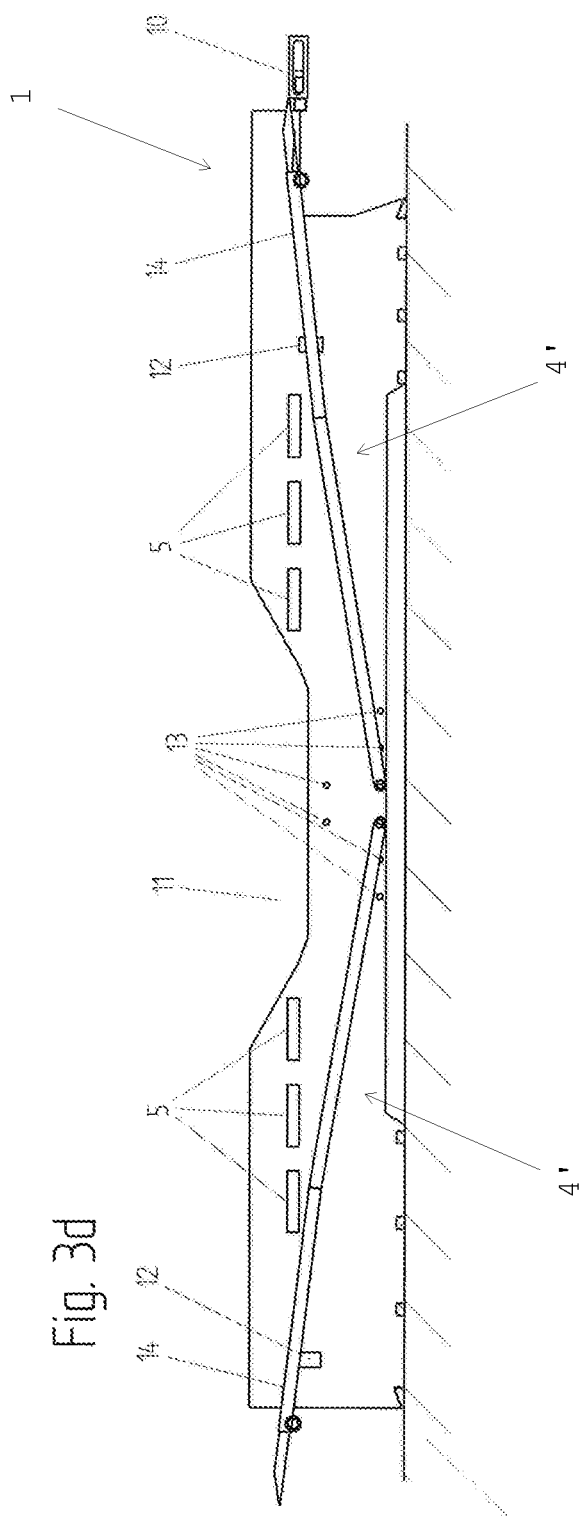

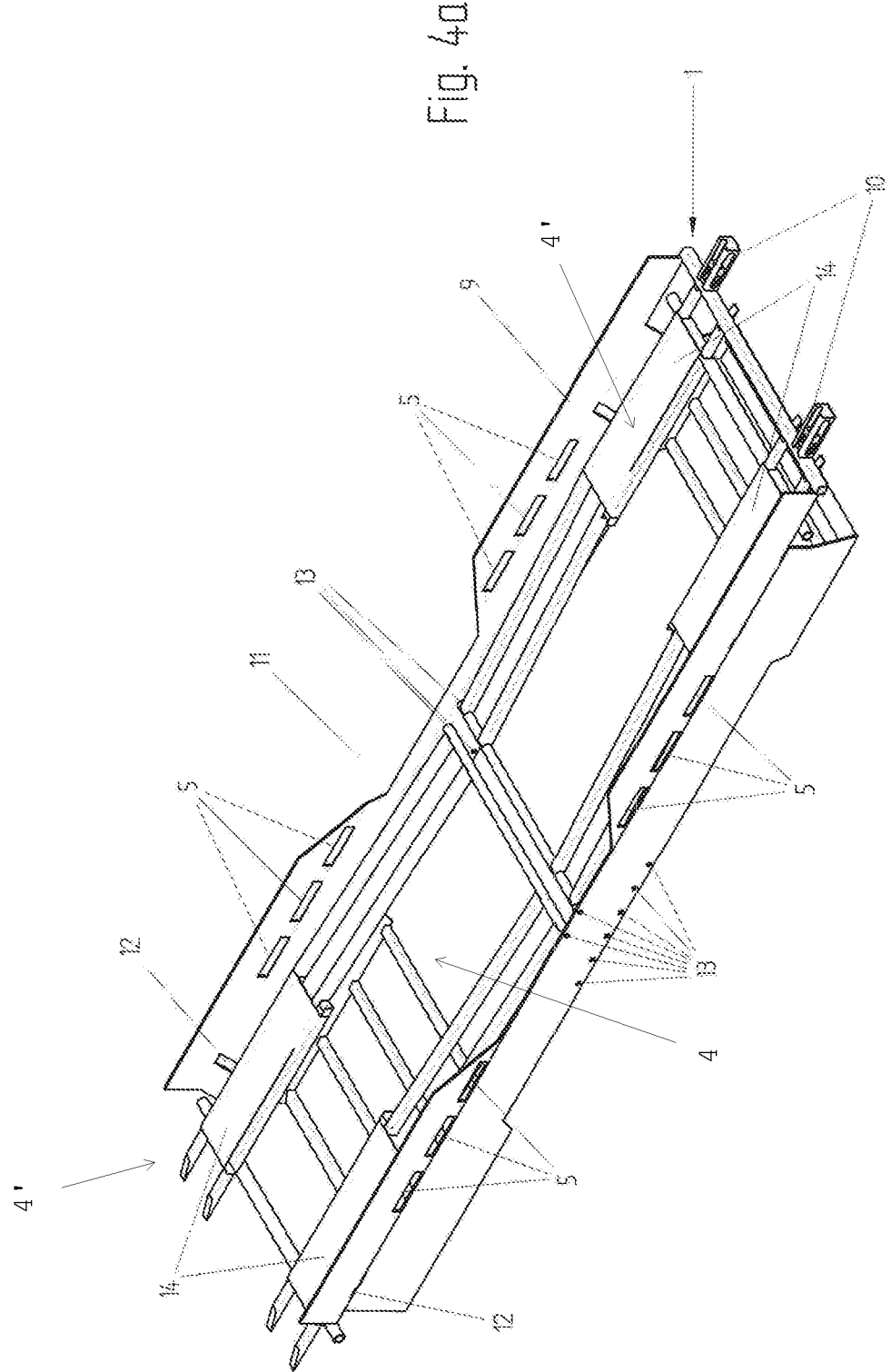

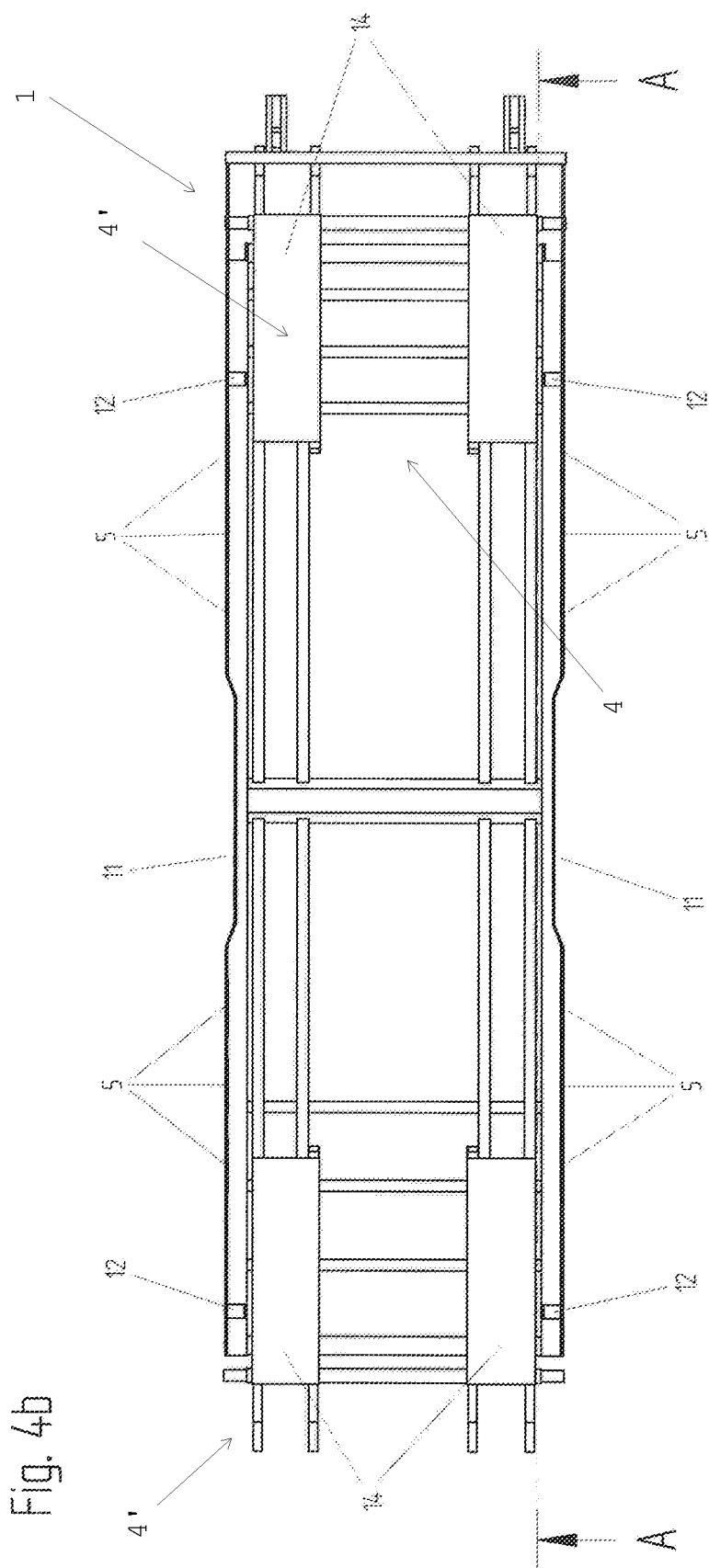

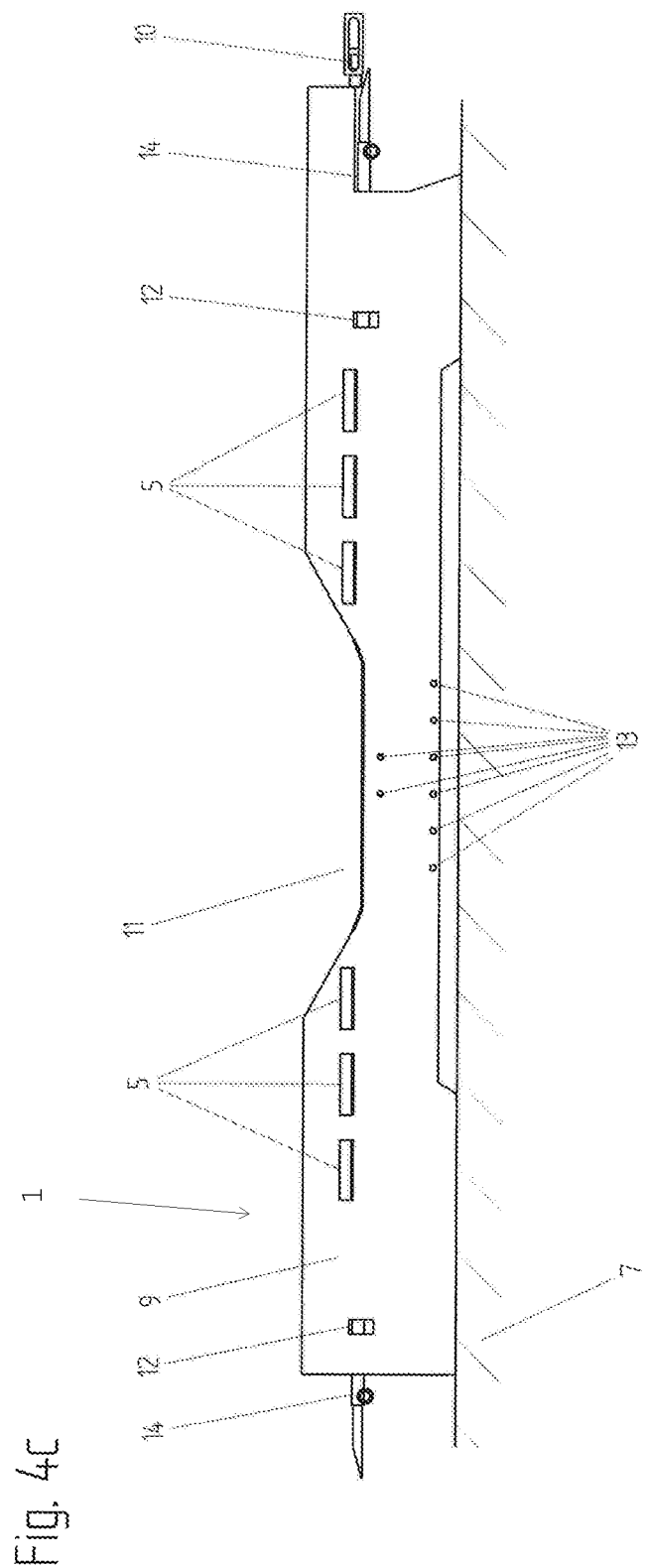

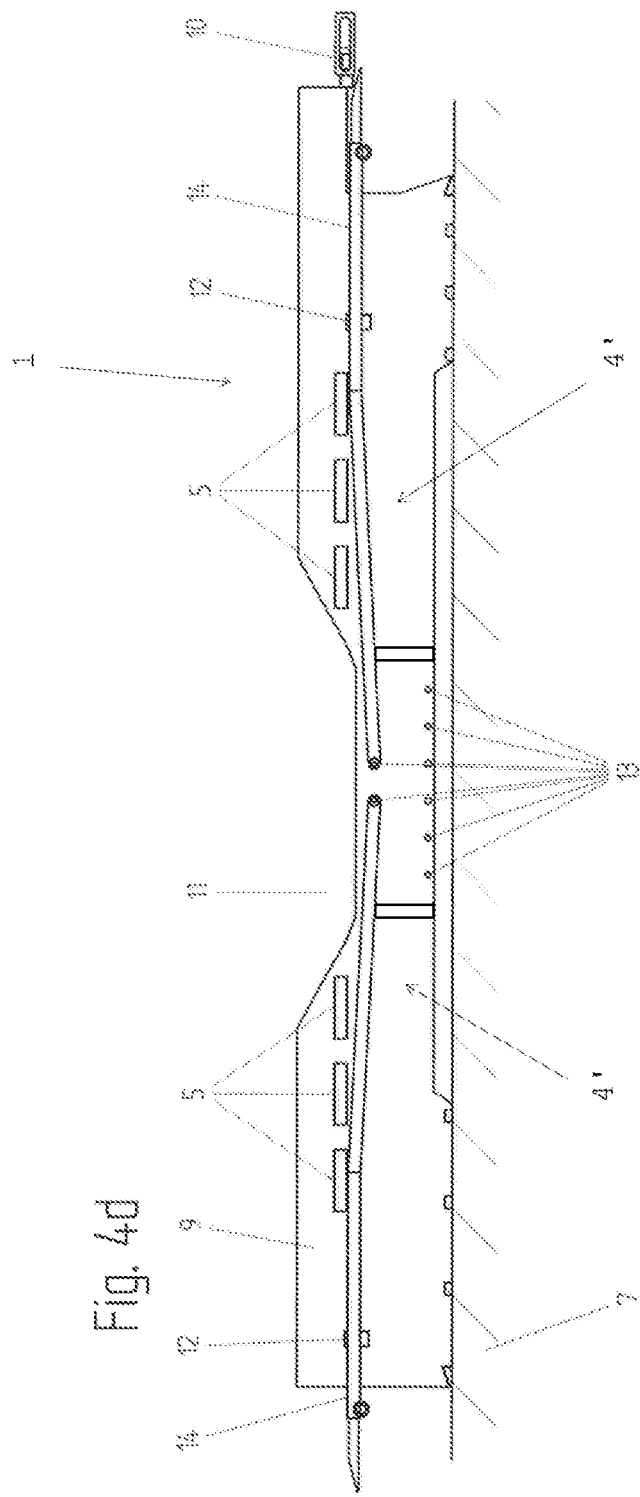

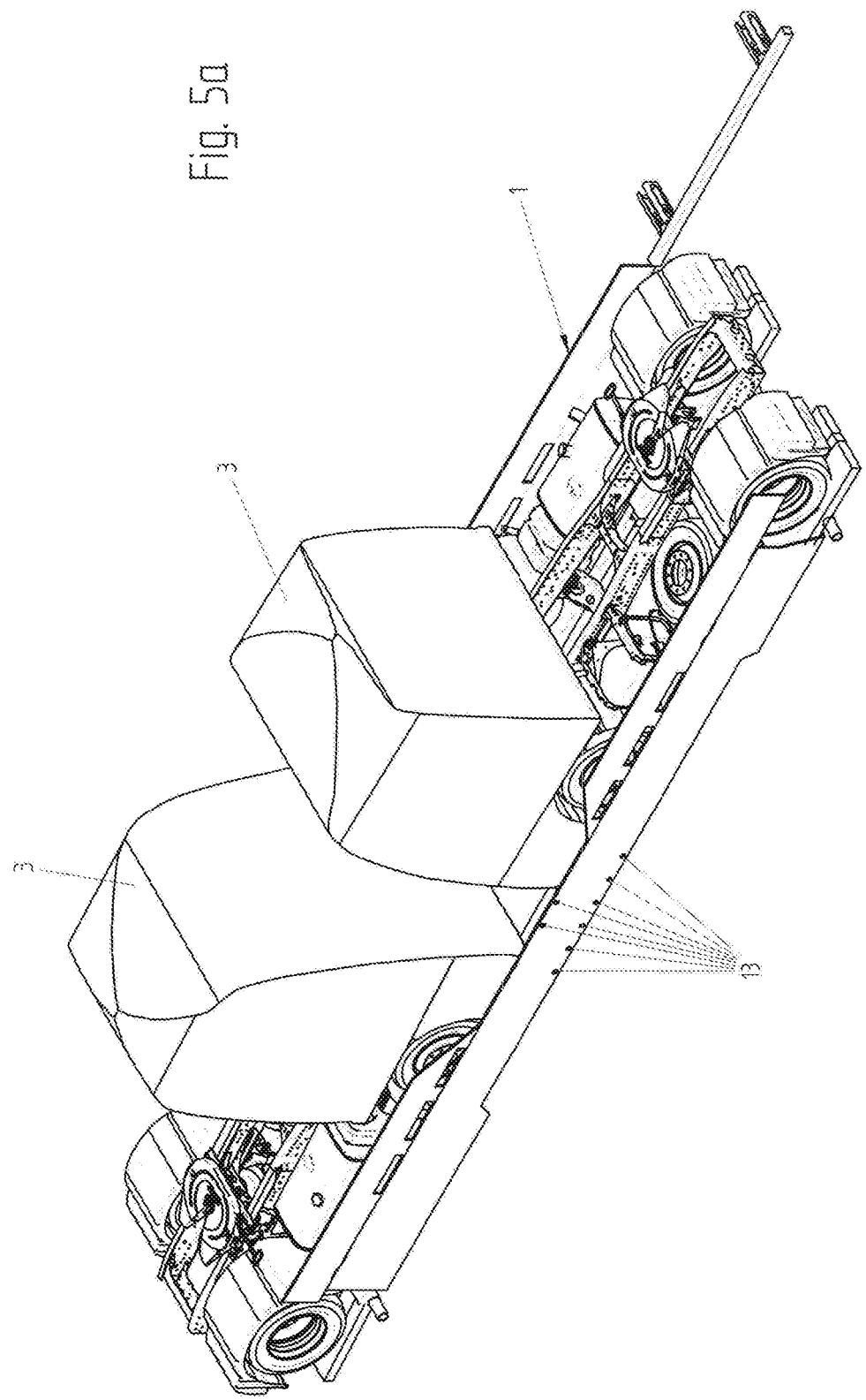

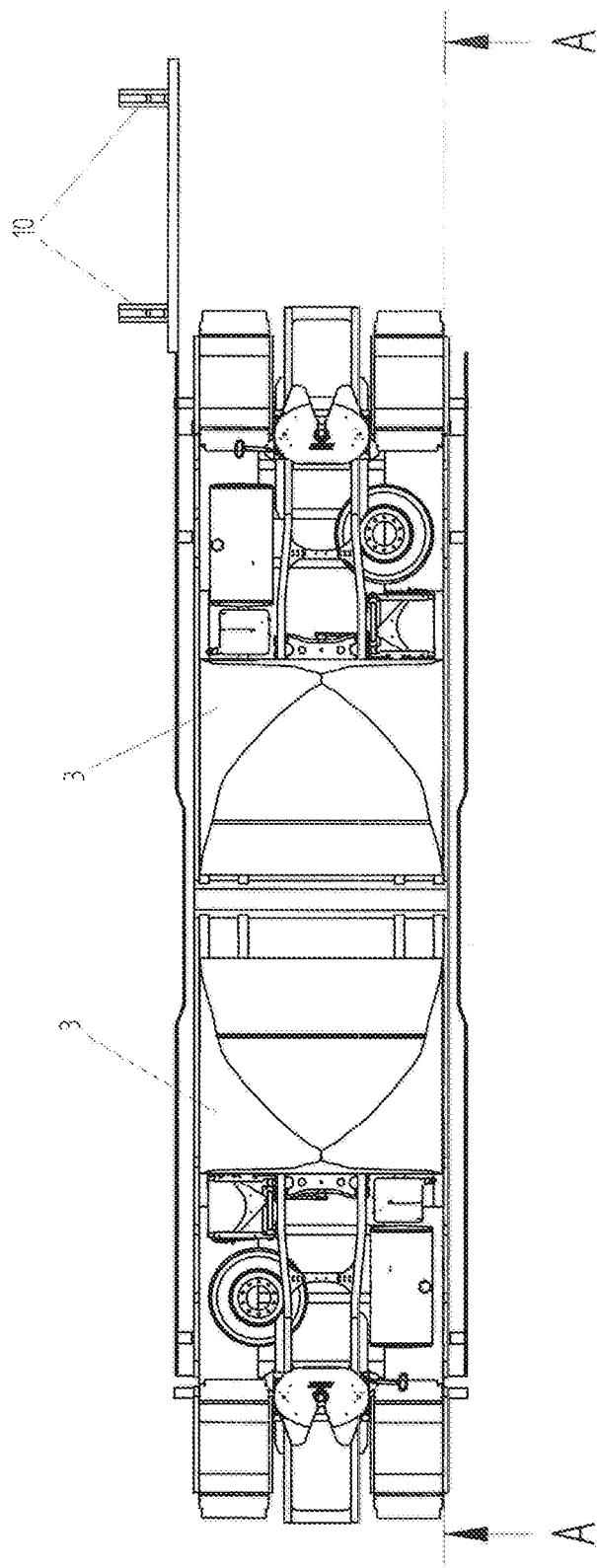

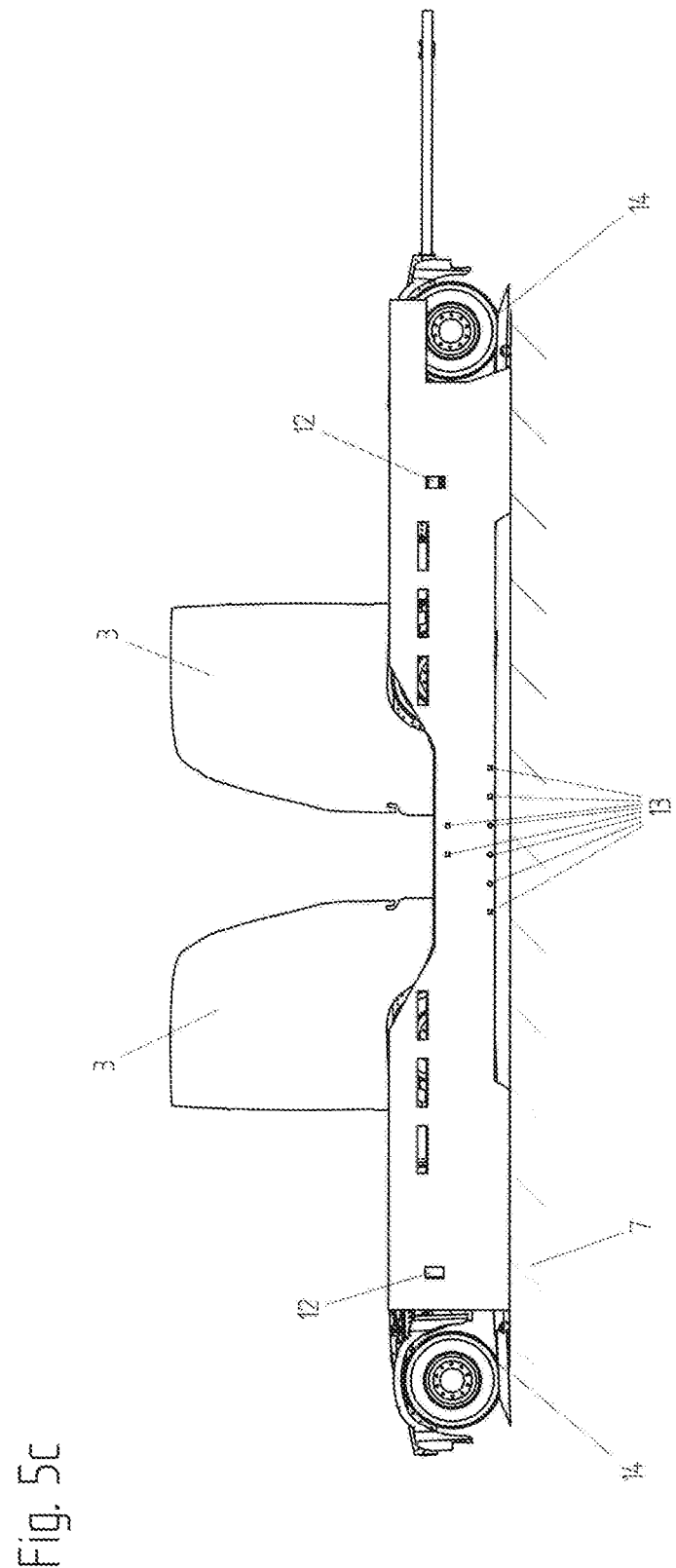

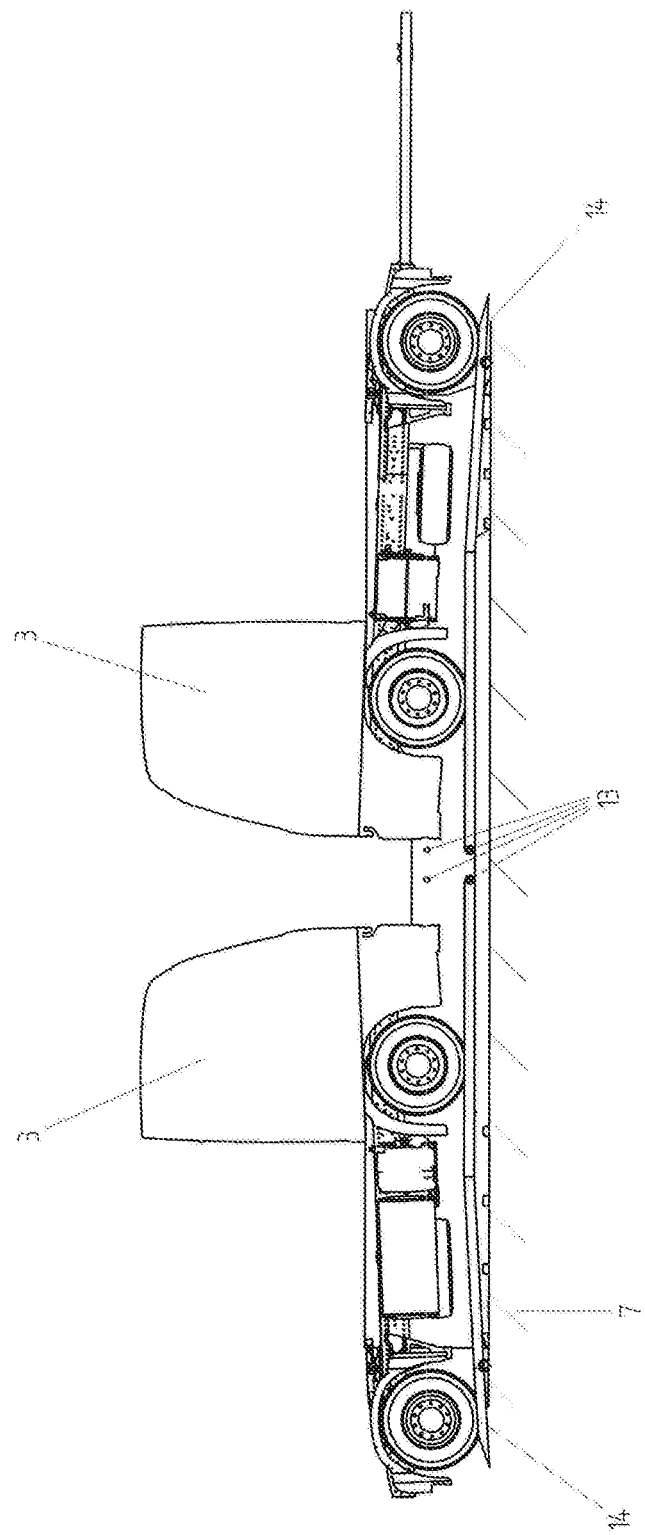
Schnitt A-A  Fig. 5d

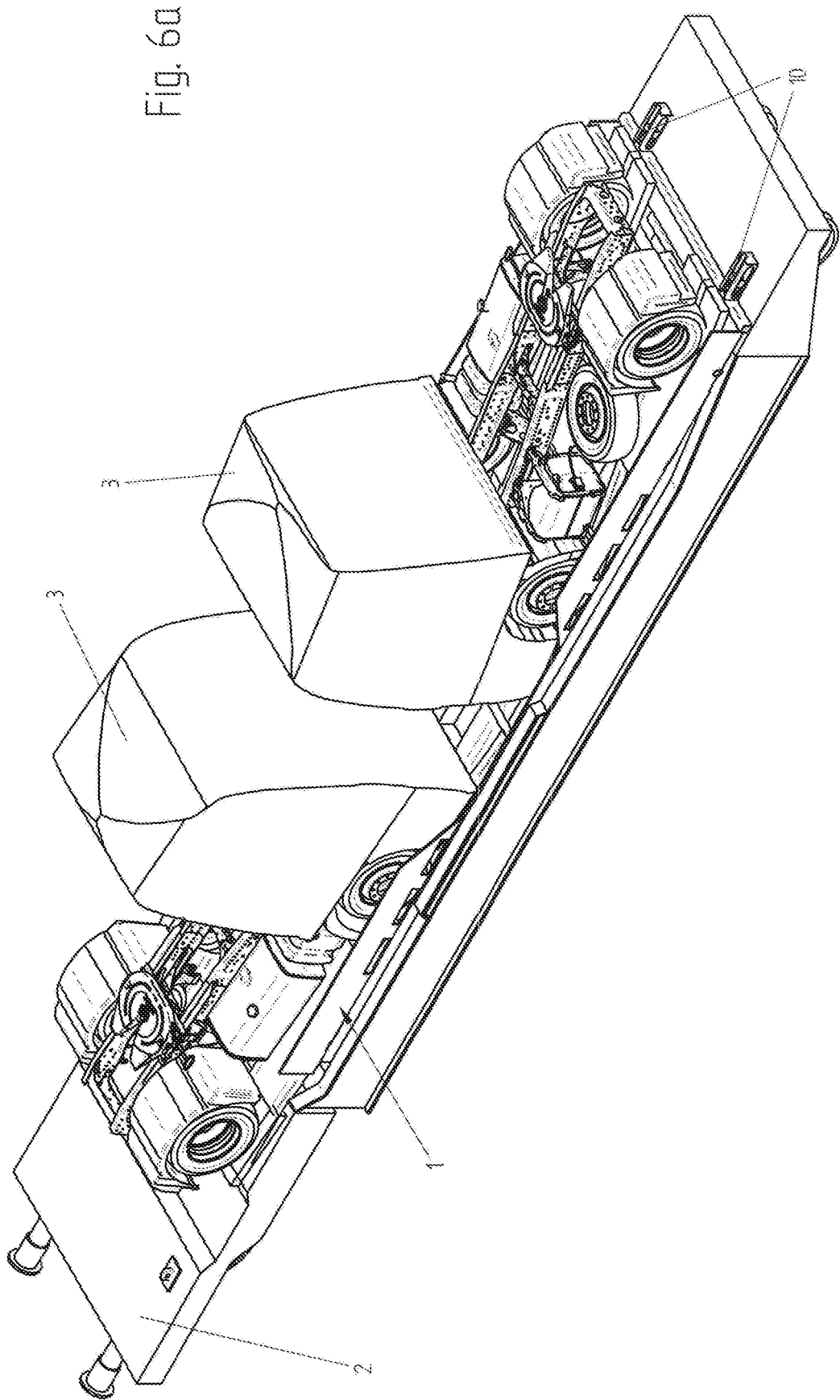

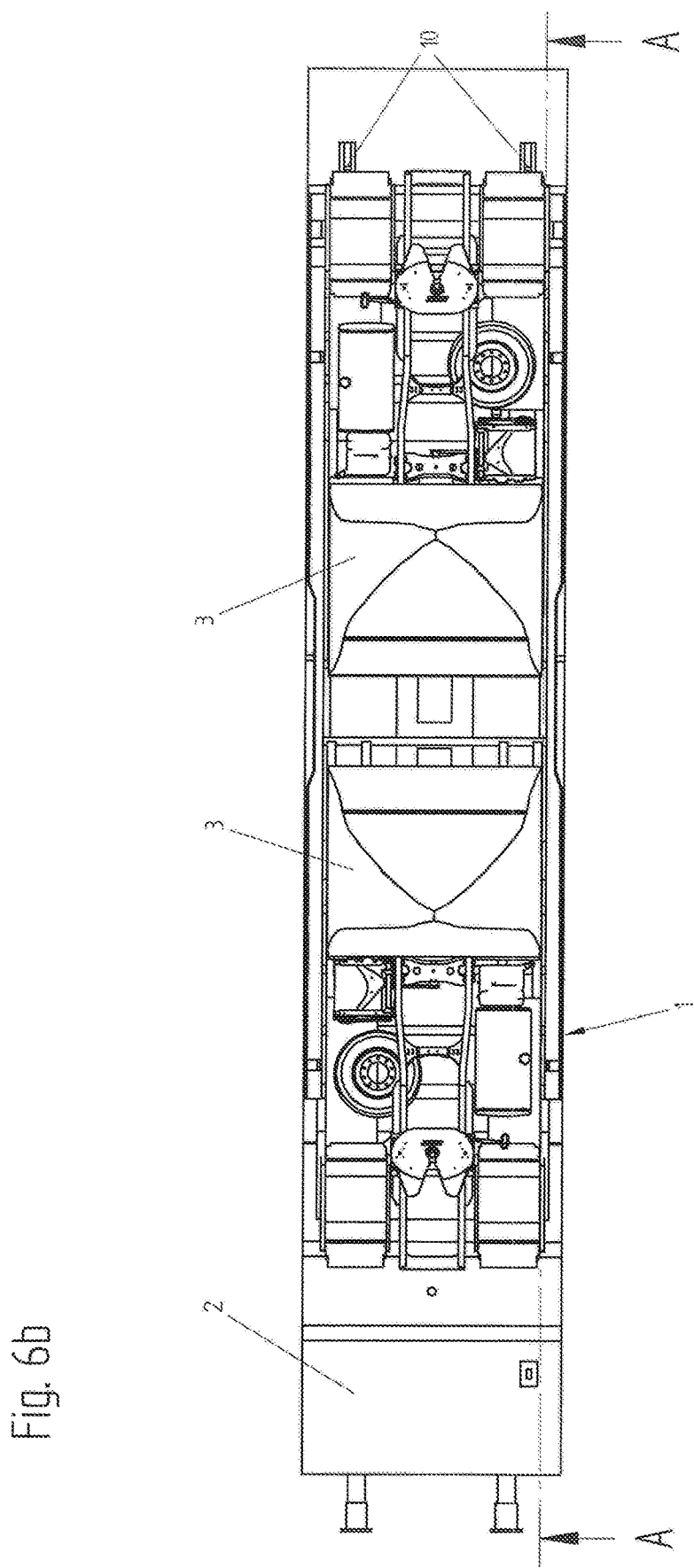

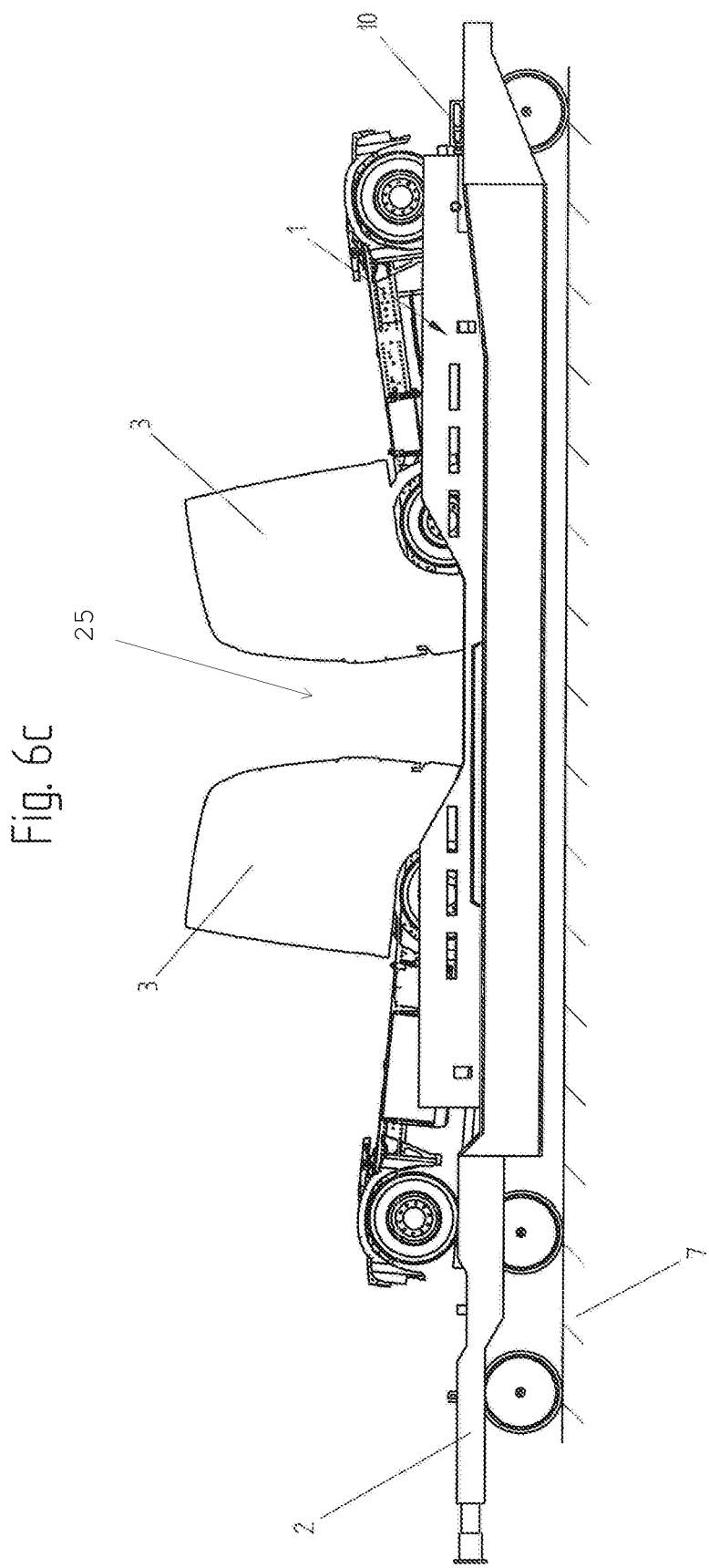

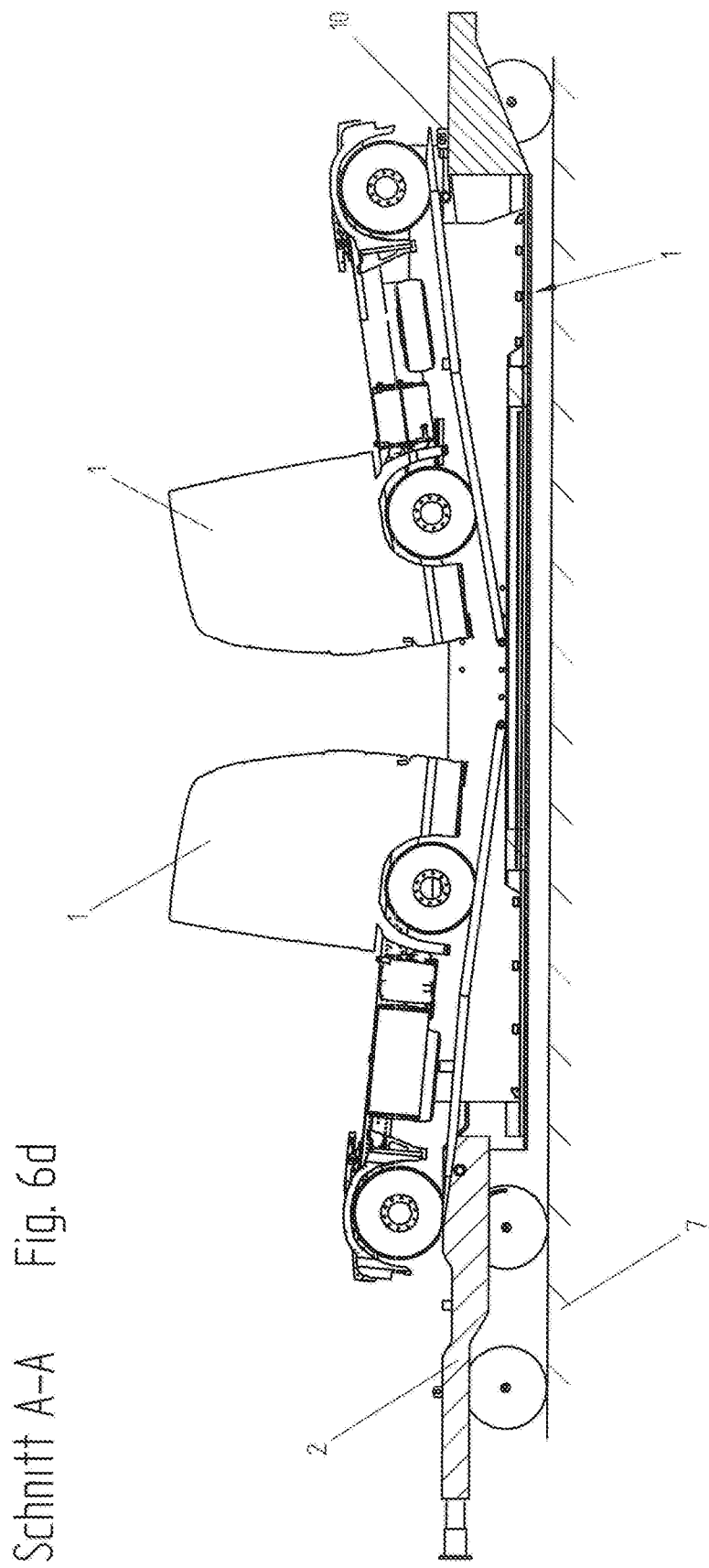

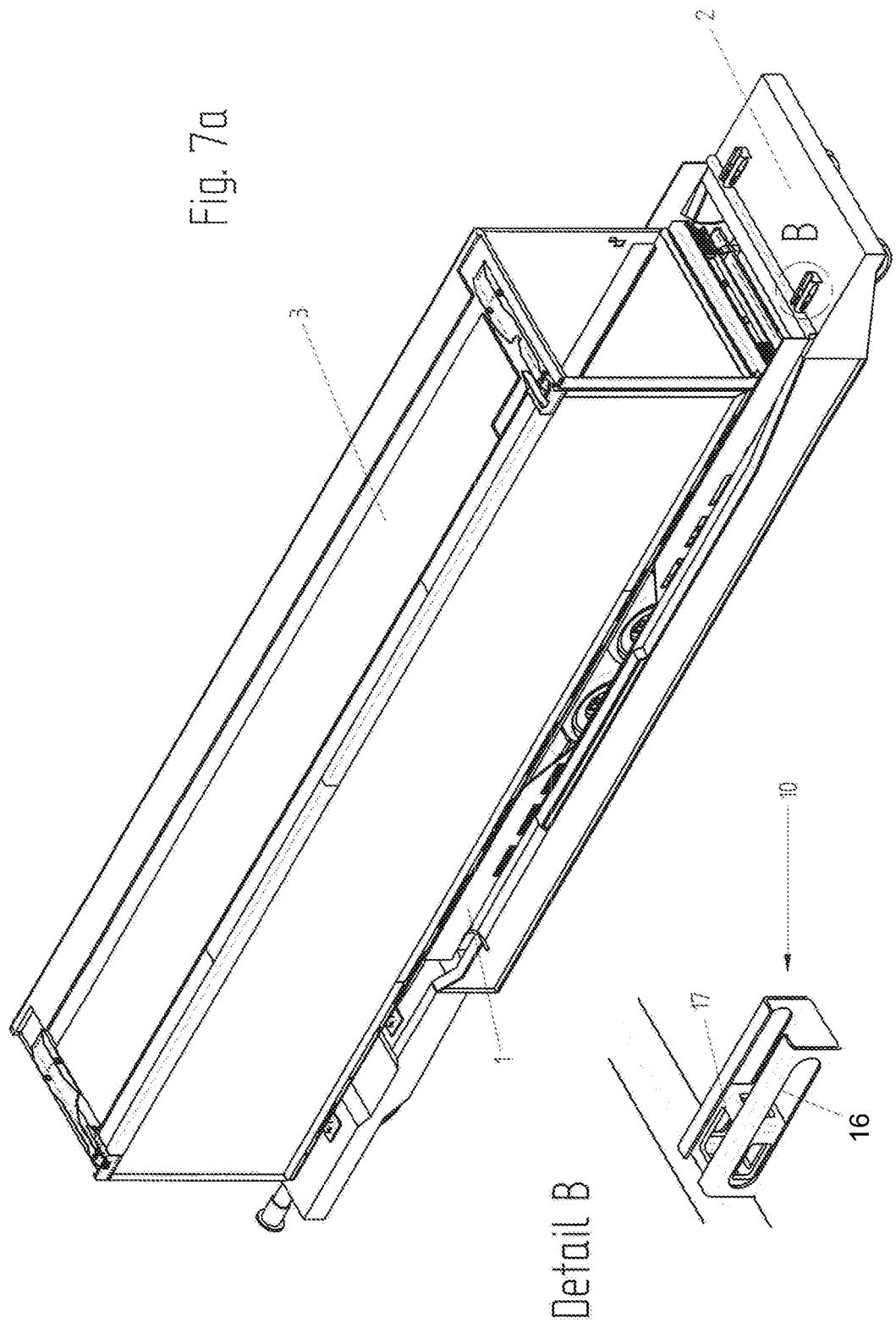

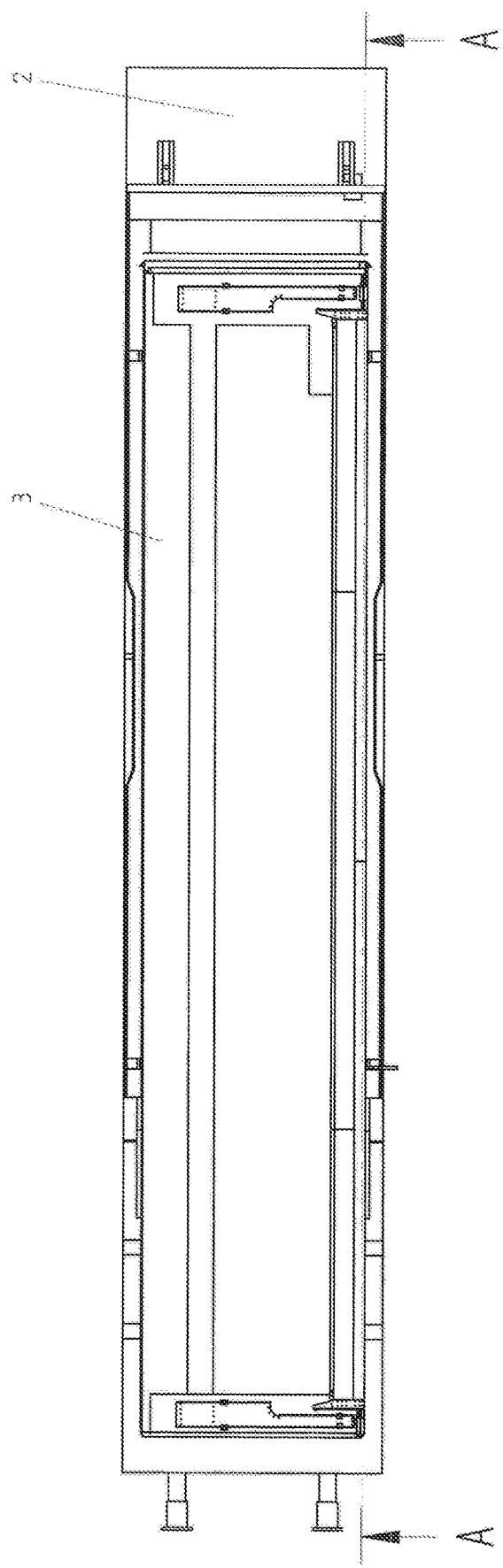

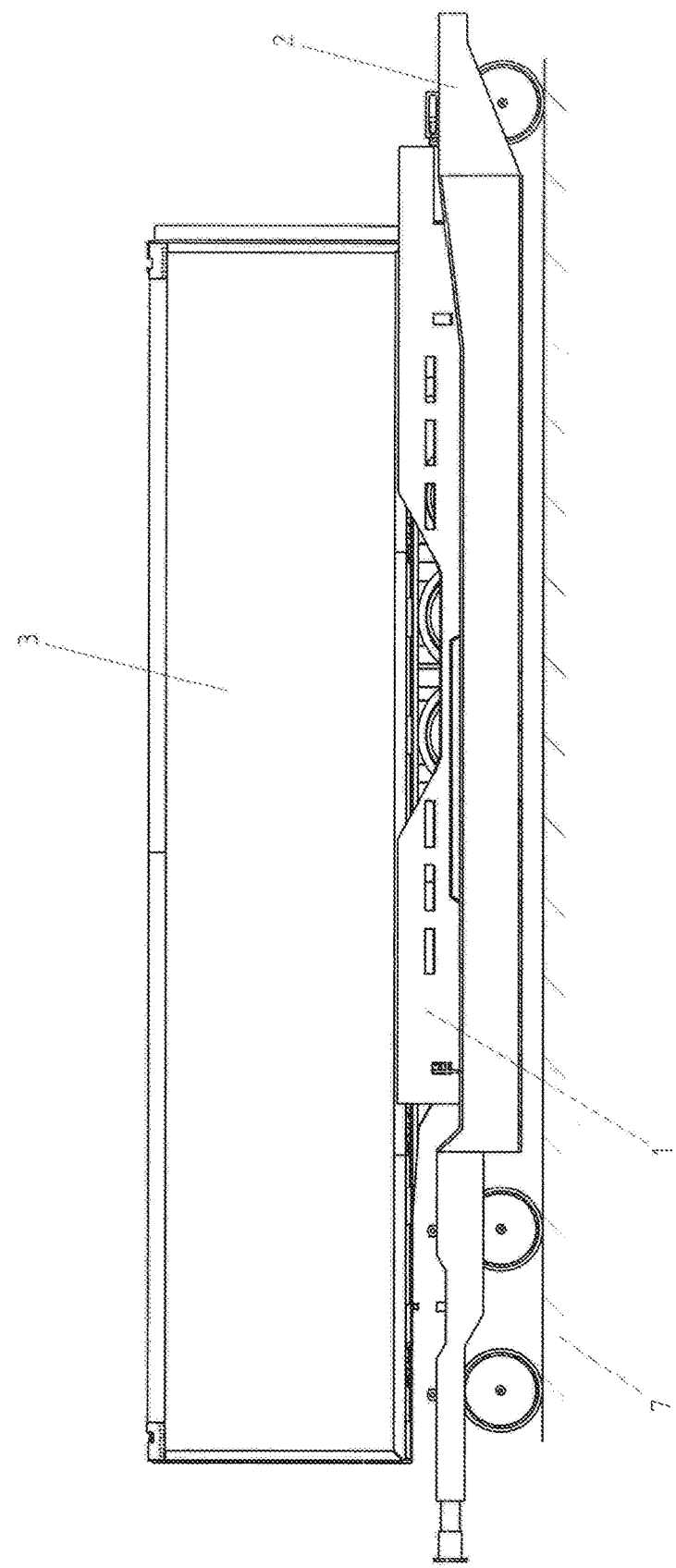

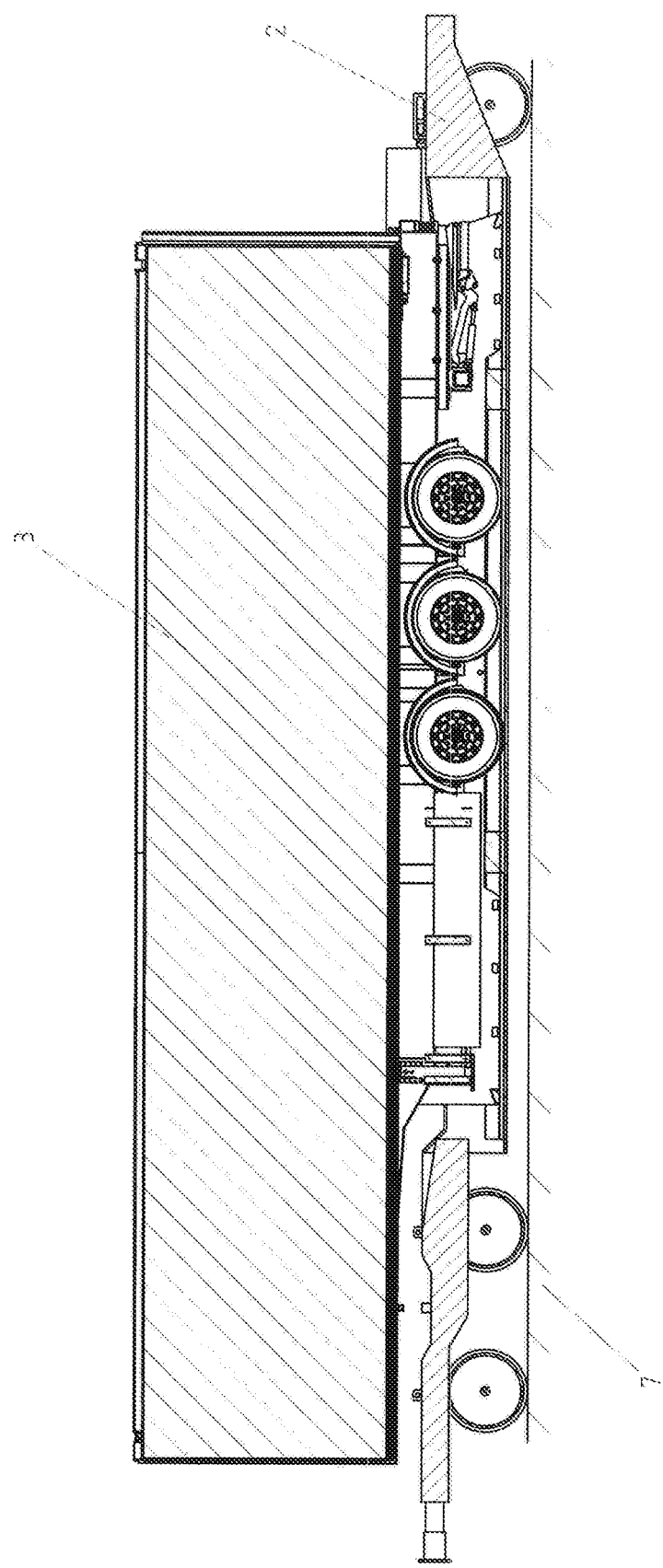

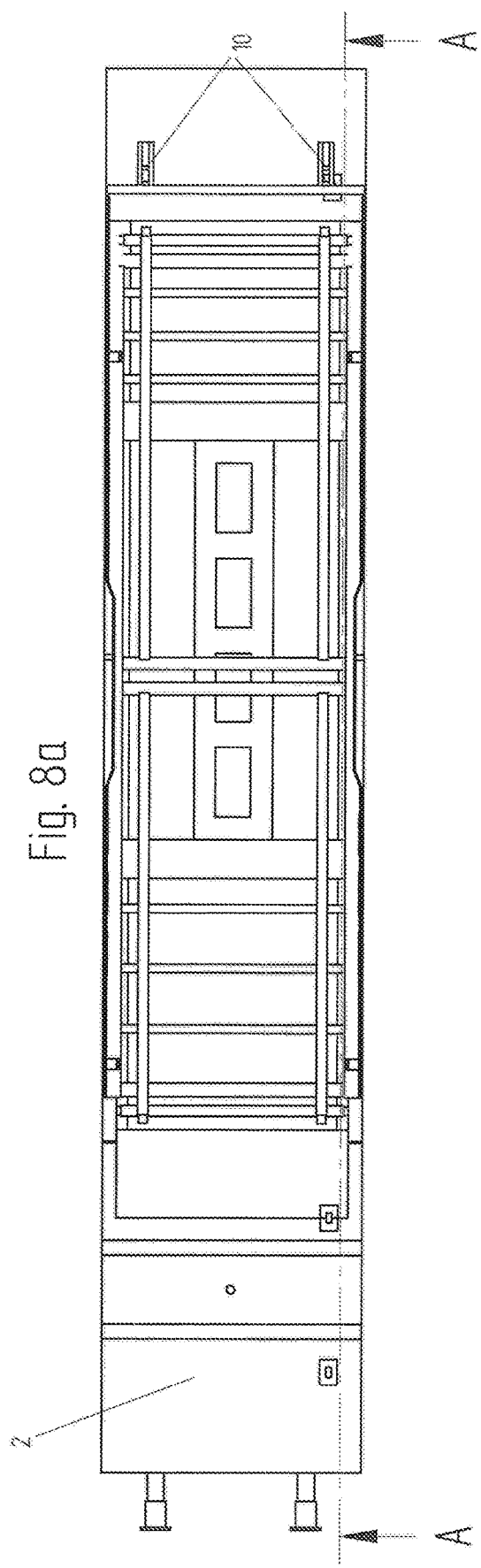

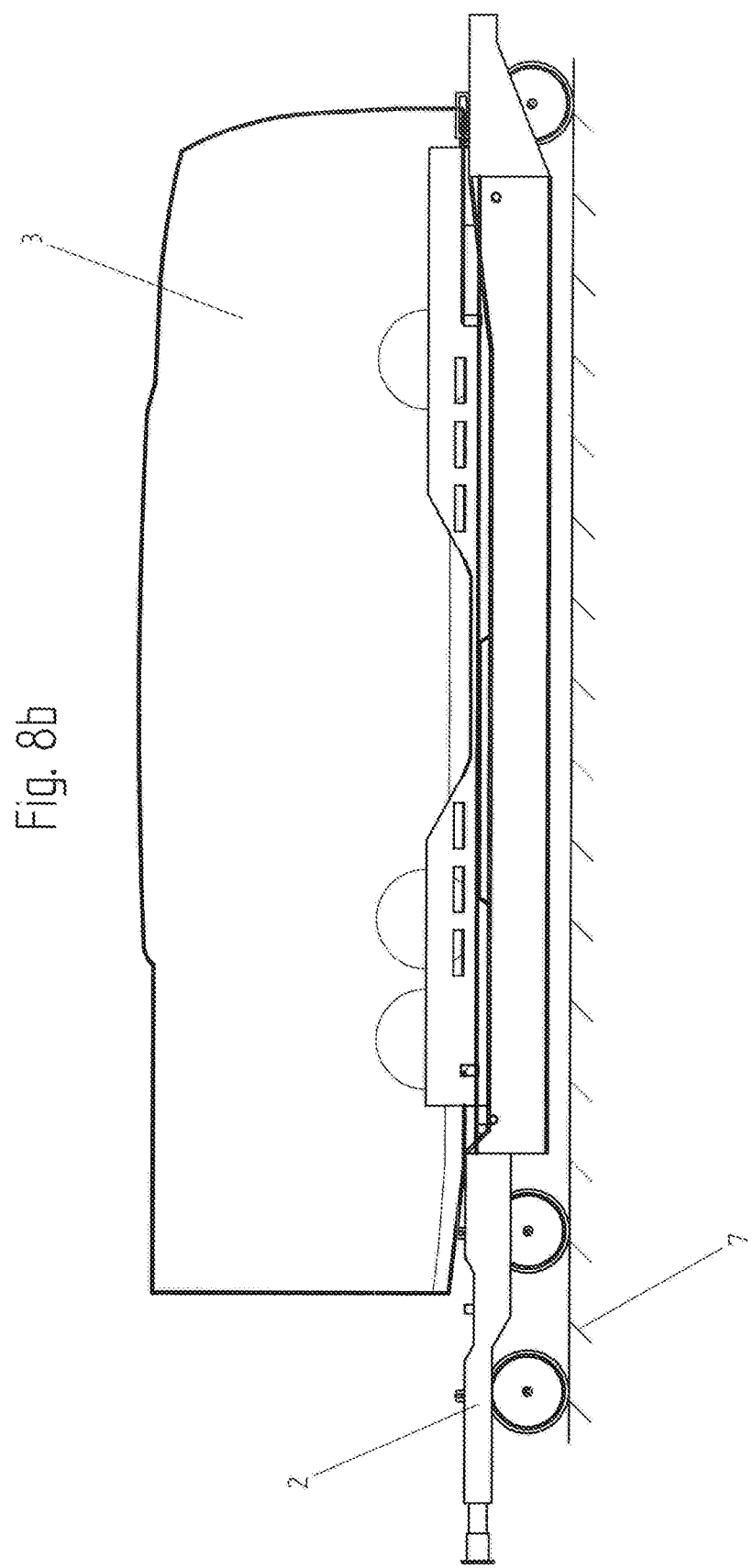

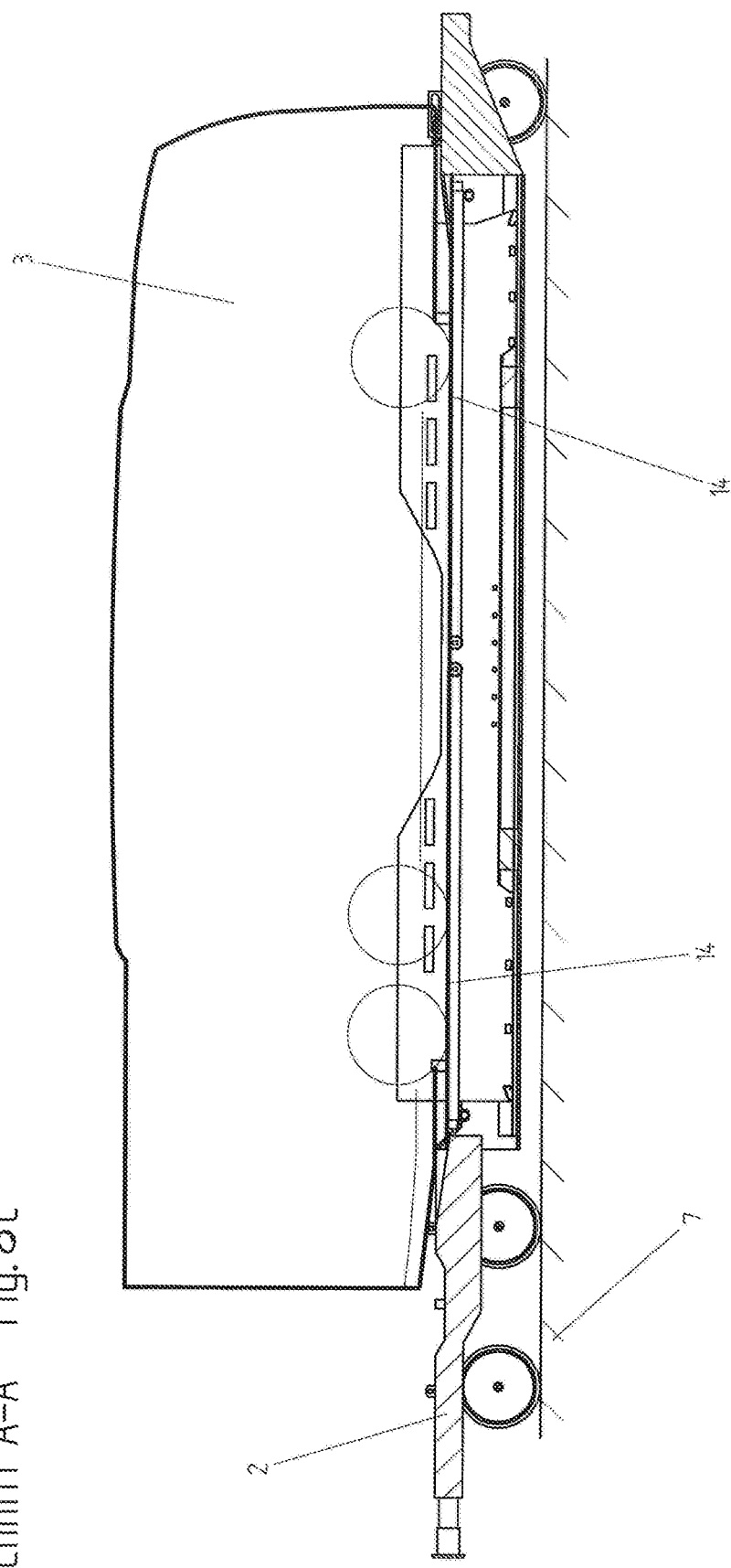

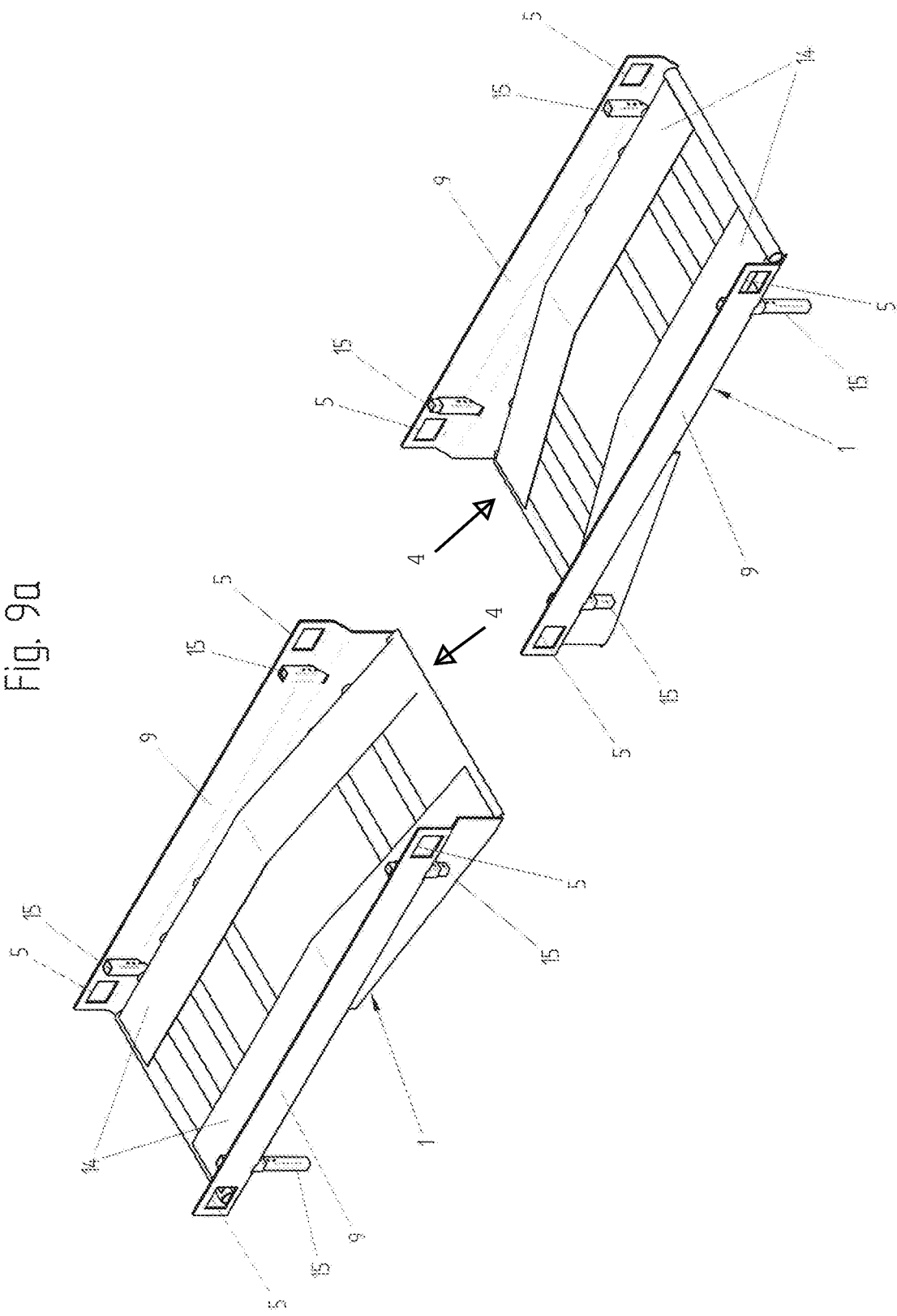

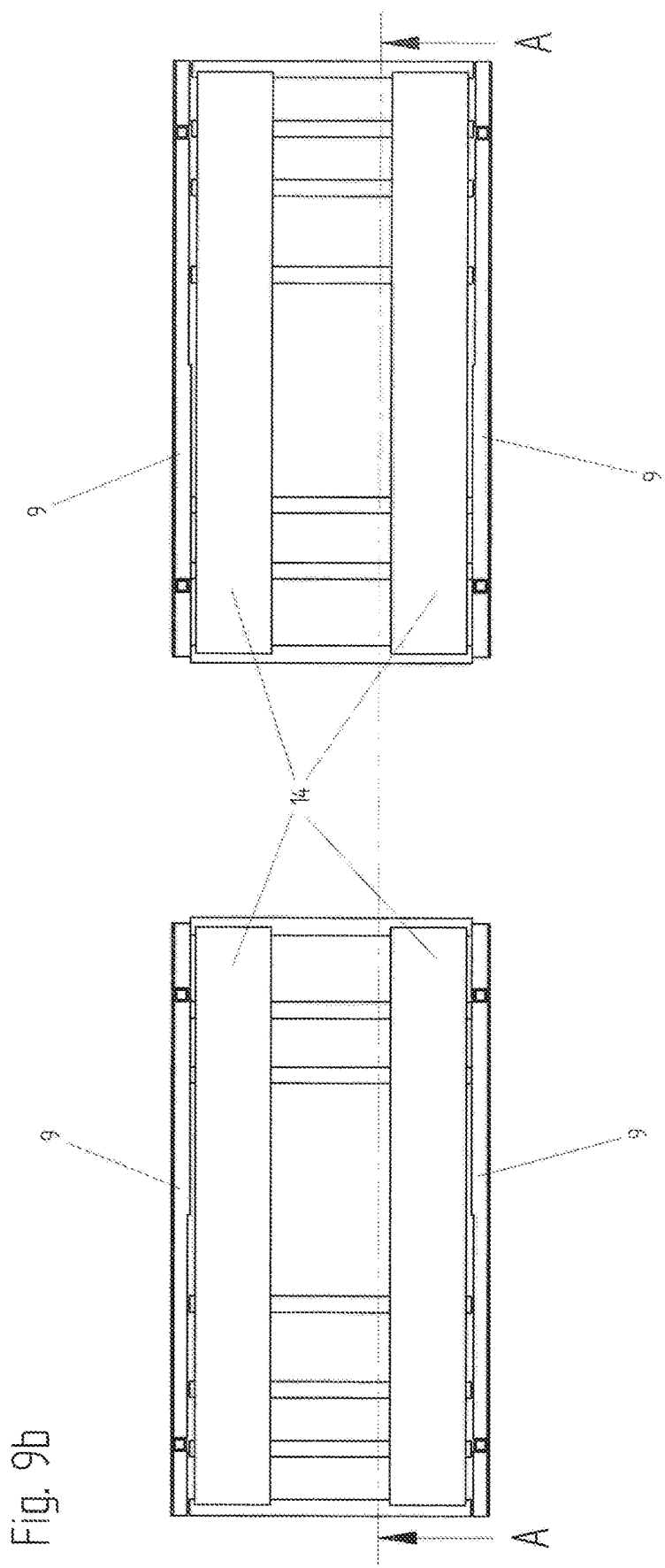

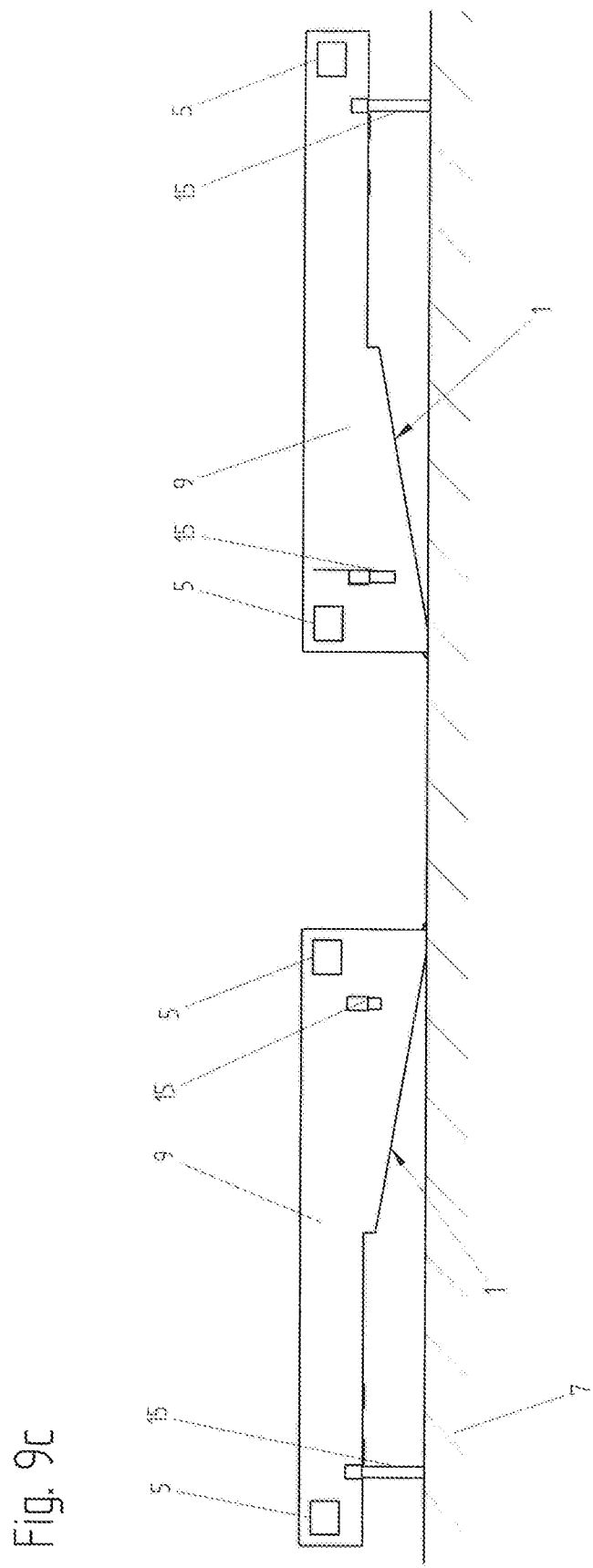

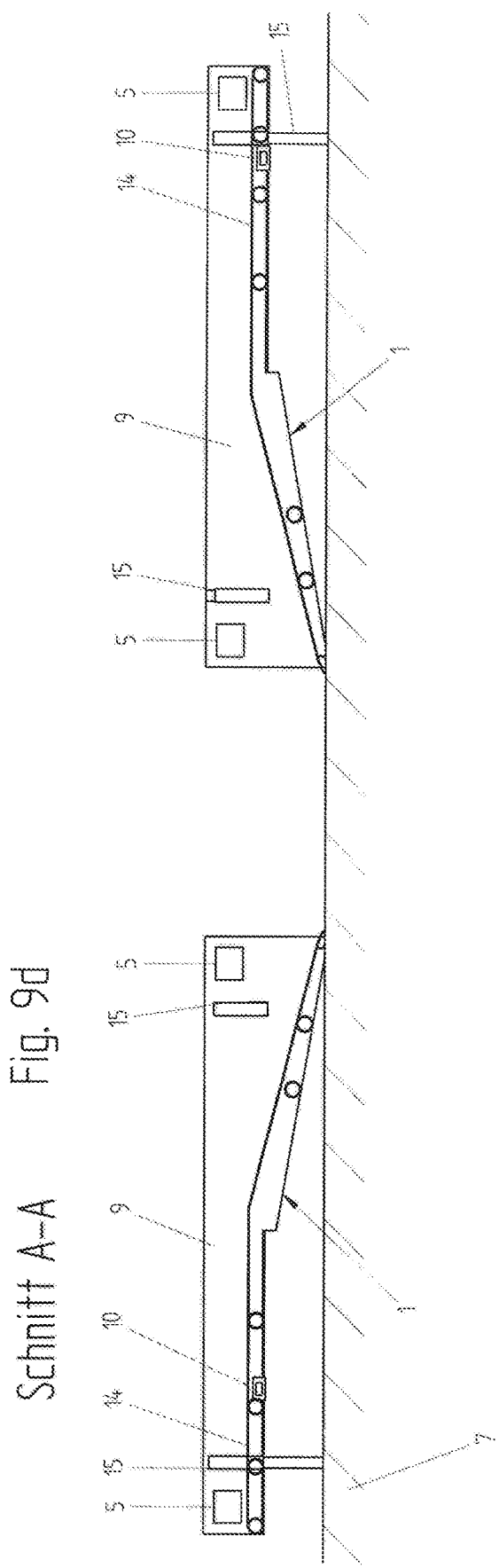

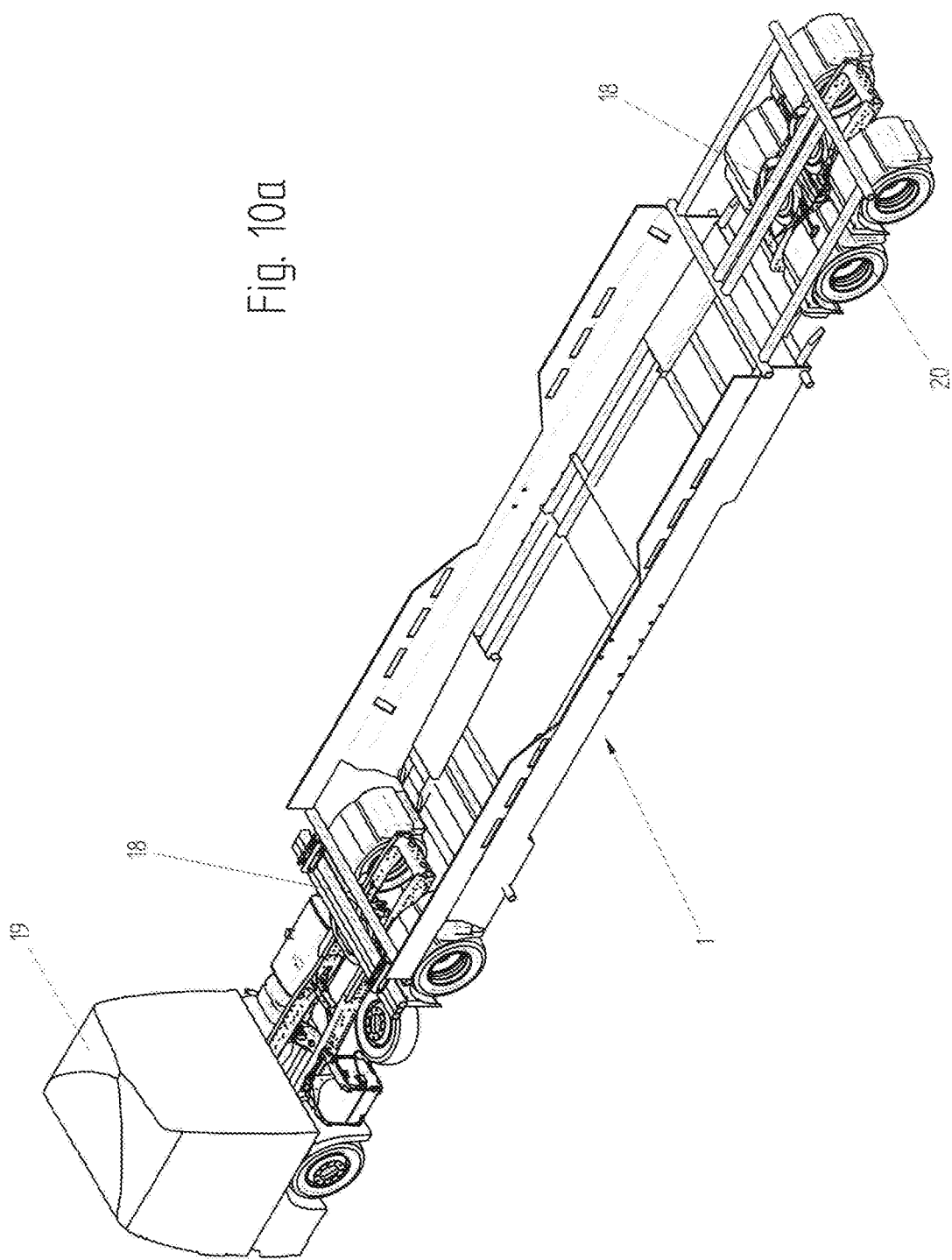

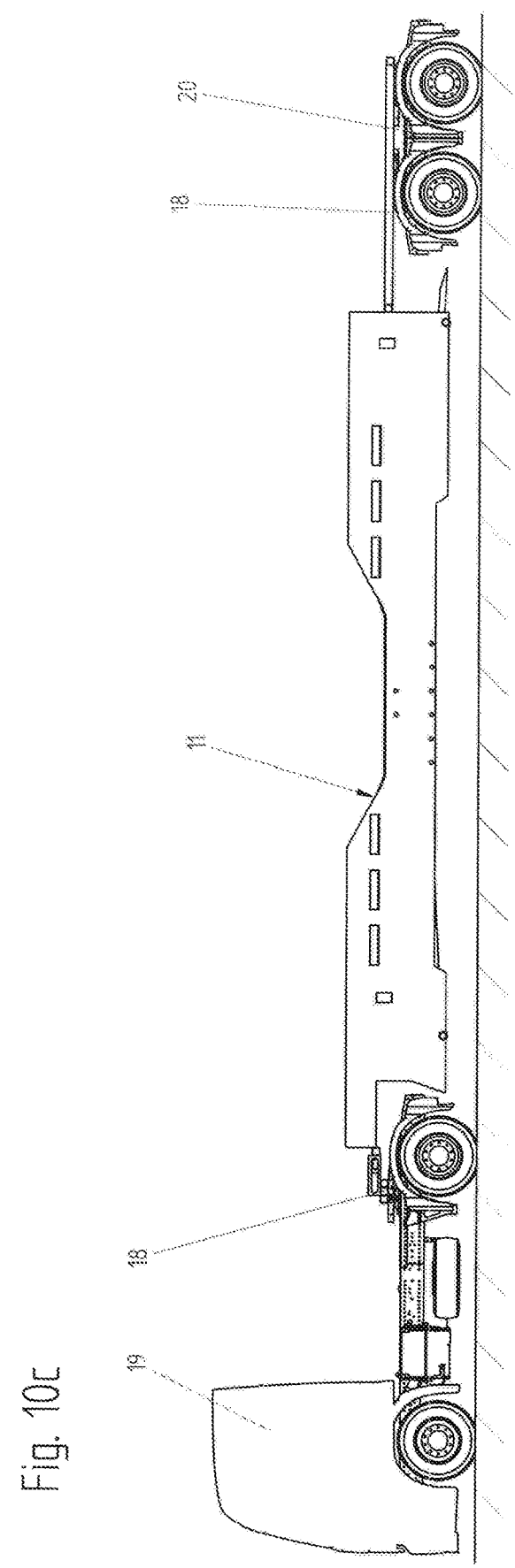

Fig. 13a
Fig. 13b
Fig. 13c
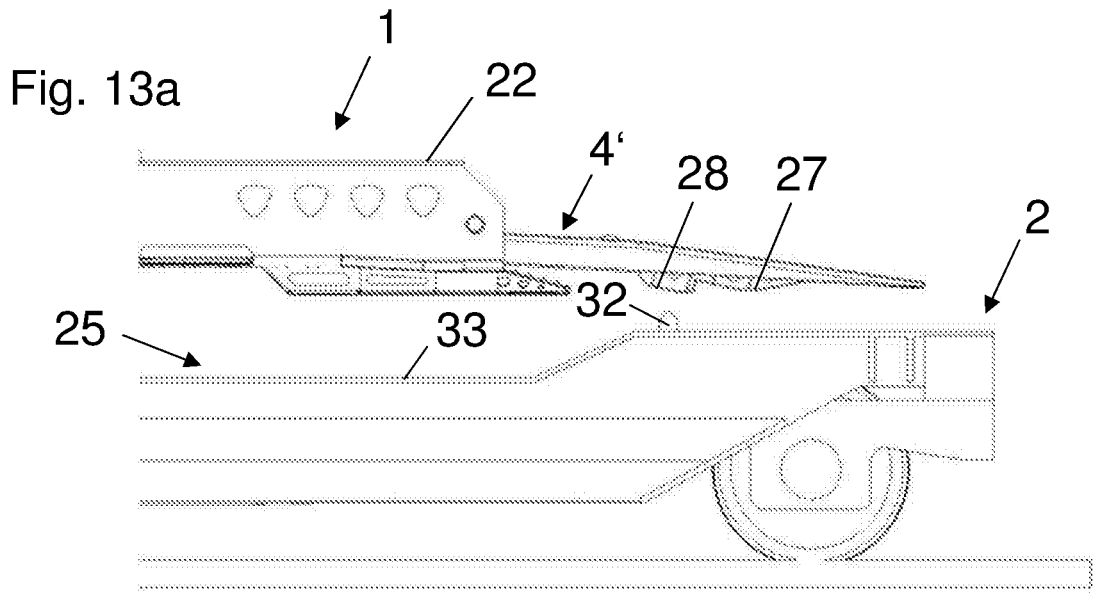
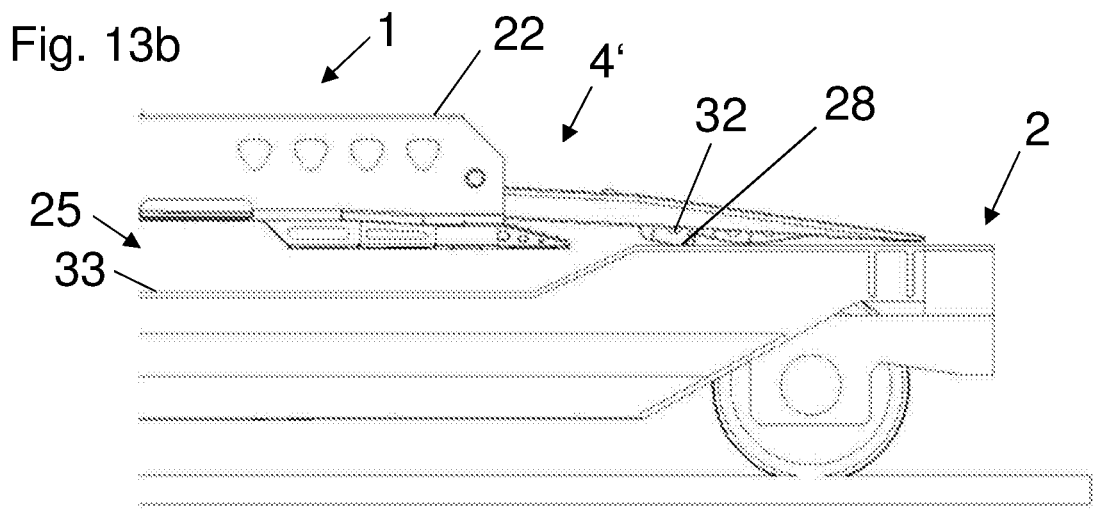
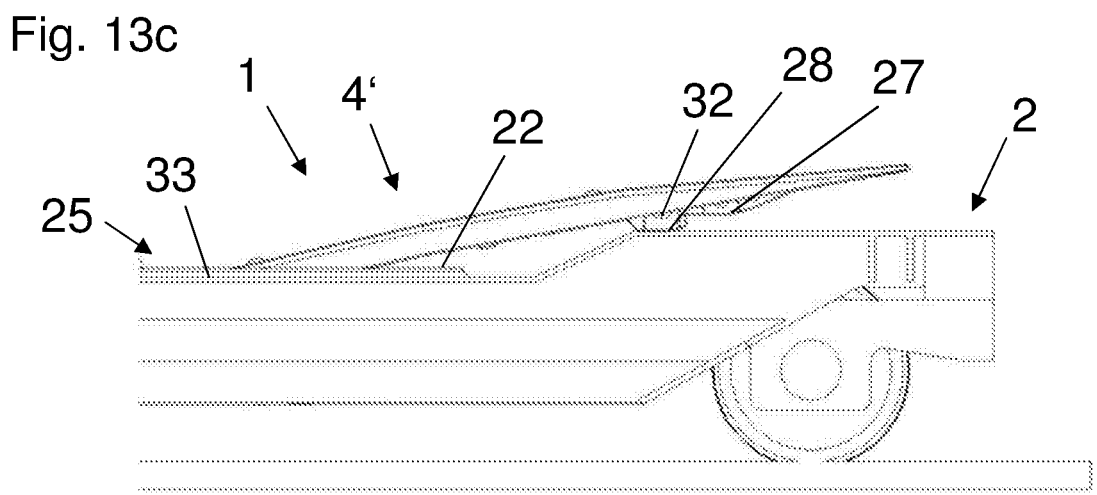

RAISABLE CARRYING DEVICE

BACKGROUND OF THE INVENTION

The present invention concerns a raisable carrying device having a supporting unit, receiving pockets, support surfaces, and a pivoting structure and a rail vehicle, in particular a pocket wagon, having such a carrying device.

It is known for trucks to be transported as a whole on so-called "rolling roads". That procedure suffers from the disadvantage that the wheels of the rail vehicles for transporting the trucks may only be of a small diameter because otherwise the height of the loaded rail vehicle is excessively great. The entire arrangement of tractor unit and semitrailer is to be transported. Only entire train loading can be effected.

Loading individual rail vehicles with cargo is generally effected using hoisting devices at terminals. As it is not every cargo that is adapted itself to be liftable, carrying devices are already known, which permit lifting of a cargo which itself is not liftable, by means of a hoisting device.

A carrying device of the general kind set forth is offered under the name NIKRASA. That carrying device has a support device which is mounted in a stationary carrier structure in a receiving position of the carrying device, in which loading and unloading are effected. After loading has been effected the support device is lifted off the stationary carrier structure by a hoisting device, by way of receiving pockets arranged on the support device. A disadvantage is that corresponding stationary carrier structures are to be provided as special equipment at every terminal.

The prior art document Baier M. et al.: "CargoBeamer—MarkteinfUhrung ist angelaufen", ZEVrail, 135, Nr. 6-7 (2011) discloses a craneable freight car attachment for loading a rail vehicle with cargo or semitrailers.

The prior art document FR 2 884 479 A1 discloses a platform for loading trailers, and the platform has a fastening device for fastening the trailer to the platform.

Special rail vehicles are also known, which permit substantially horizontal loading of the rail vehicle. Those special rail vehicles also require special equipment in the terminals.

SUMMARY OF THE INVENTION

The object of the invention is to provide a carrying device which can be employed without the use of special equipment in the terminals and to provide a rail vehicle having such a carrying device.

That object is attained by a liftable carrying device having the features such as a supporting unit, receiving pockets, support surfaces, and a pivoting structure and a rail vehicle having such a carrying device.

With a carrying device according to embodiments of the invention, cargo, which itself does not have to be directly cranable, can be loaded in many different forms as the carrying device itself is cranable. The cargo may involve, for example, vehicles (for example semitrailers, tractor trucks, tractors, buses) or non-drivable cargo (for example containers).

In the present disclosure the term receiving position is used to denote that position of the at least one supporting unit in which loading or unloading of the carrying device is effected. In the receiving position the at least one supporting unit is oriented substantially horizontally and after loading with cargo the cargo is accordingly also oriented substantially horizontally. The term loaded position is used to denote that position of the at least one supporting unit in which the cargo, after the conclusion of the loading operation, is disposed jointly with the carrying device on the rail vehicle.

By virtue of the fact that the carrying device has support surfaces for placement directly of the carrying device on a terminal floor, no stationary carrier structure is required, which would have to be provided as special equipment in every terminal.

It is particularly preferable that the carrying device, in particular at least one supporting unit, can be directly driven on to, in the condition of the carrying device in which it is placed on the terminal floor. That can either be made possible by the at least one supporting unit itself resting directly on the terminal floor, or by the carrying device having an integrated travel ramp.

The possibility of being able to drive directly on to the carrying device or the at least one supporting unit, in the placement condition of the device on the terminal floor, can be achieved by various features in isolation from each other or in combination. The inherent weight of the carrying device, in conjunction with an angle of inclination, that is selected to be sufficiently low, of a drive-on element of the supporting unit may be sufficient. The angle of inclination can preferably be less than 20 degrees relative to the horizontal.

Alternatively or in addition, friction-enhancing measures can be adopted, in particular in the case of a smooth terminal floor.

Preferably the support surfaces are equipped with friction-enhancing contact devices. That ensures, even when dealing with a smooth terminal floor, that the carrying device can be driven on to, without being displaced relative to the terminal floor.

Preferably the carrying device has a carrying frame, the receiving pockets and the support surfaces being arranged on the carrying frame.

The receiving pockets are preferably adapted for gripping edges of a so-called "spreader" which can be mounted to a crane or a so-called "reach stacker".

The carrying frame can be opened at least at one of its sides. Usually the carrying frame will be of an elongate configuration and include two longitudinal sides. In addition, the carrying frame can also include one or two ends. In that case, at least one of the two longitudinal sides and/or at least one of the two ends can be openable (for example by the frame portions of the corresponding side being adapted to be pivotable or removable). The fact that an end can be opened makes it possible to drive on to the supporting unit (or in the situation where both ends are adapted to be openable, it is even possible to pass through the carrying device). The openability of one or both longitudinal sides makes it easier to load the supporting unit with cargo.

As already stated in the opening part of this specification, the carrying device can be lifted by a hoisting unit present at a terminal, and loaded on to a rail vehicle. The hoisting unit is generally a loading crane which is lowered to the height of the carrying device or the receiving pockets arranged thereon, and which engages with, grabs into, the receiving pockets or eyes provided on the carrying device in order to lift the carrying device.

Preferably, the receiving pockets, in a receiving position of the at least one supporting unit, in which the at least one supporting unit is oriented substantially horizontal, are arranged spaced vertically relative to the at least one supporting unit above the at least one supporting unit. It is particularly preferable that the receiving pockets are arranged in an upper end region of the carrying frame. By virtue of the arrangement of the receiving pockets in an upper end region of the carrying frame, and thus spaced vertically relative to the supporting unit or the carrying surface of the carrying device, it is in particular possible for the carrying device to be introduced into a pocket of a rail vehicle which is in the form of a "pocket wagon", insofar as the carrying device can be lowered by the hoisting unit from above into the pocket of the pocket wagon. In the lowered position, the supporting unit is disposed at least partially below an upper edge of the pocket of the pocket wagon. The carrying frame is also disposed for the greatest part below the upper edge, in the lowered position of the carrying device. The receiving pockets however are disposed above the upper edge.

For lifting of the carrying device by means of the hoisting unit, there are preferably at least two receiving pockets for each longitudinal side of the carrying frame, the receiving pockets forming a pair thereof. The spacing of the two receiving pockets of the pair relative to each other can be selected in accordance with the draft standard prEN 70015: 2013 bearing the date 2013-08, and accordingly can be about 4876 mm+/−100 mm. Preferably, there is a plurality of pairs of receiving pockets for each longitudinal side, which are arranged in mutually displaced relationship along the longitudinal side in order to take account of different positions of the center of gravity of the loaded carrying device.

The carrying frame preferably includes two elongate longitudinal sides which are spaced from each other to such an extent that the carrying device can be easily loaded with vehicles (for example semitrailers, tractor trucks, tractors, buses) or with non-drivable cargo (for example containers). Preferably, the average internal width (along the longitudinal extent) between the two longitudinal sides of the carrying frame is at least about 2600 mm.

Preferably the receiving pockets are arranged in an upper end region of the longitudinal sides. Further, the receiving pockets can be arranged in the regions of the respective longitudinal ends of the longitudinal sides.

The carrying capacity of the proposed liftable carrying device is preferably at least about 7.5 metric tones (t) per supporting unit, both in the set-down and also in the lifted condition, in which the carrying device is lifted by means of a loading crane. The carrying capacity of the carrying frame can be at least about 15 t and preferably up to about 36 t.

On the outside the longitudinal sides can respectively have a stiffening element which at least partially extends along the length thereof (for example an upper flange). The stiffening element can preferably extend along the entire length of the longitudinal side. Depending on the respective configuration of the pocket wagon it can also have a crank offset preferably in the region of the middle in order to follow the contour of the pocket wagon.

The stiffening elements prevent deflection or buckling of the carrying device during the lifting operation in the preferred situation, the wall thickness being kept as small as possible to make best possible use of the internal space. The arrangement of the stiffening elements at the outside of the longitudinal sides avoids compromise in respect of the width available in the interior, which with the invention is up to 2600 mm, over the entire length of the longitudinal sides.

The receiving pockets are preferably arranged above the stiffening elements.

The carrying device can be lowered as far as the height of the stiffening elements into the pocket of the pocket wagon.

The at least one supporting unit can be in the form of a carrying surface or in the form of a plurality of struts. A carrying surface can be, for example, flat or can include trough-shaped recesses which are so shaped that they can partially receive wheels of cargo in the form of vehicles.

The at least one supporting unit is moveable between a receiving position for the cargo in which the cargo is oriented substantially horizontally and a loaded position for the cargo in which the cargo is inclined. That embodiment is suitable in particular—but not only—for loading rail vehicles in the form of pocket wagons.

That configuration enjoys a whole row of advantages. By virtue of the fact that the cargo is arranged inclined in the loaded position, the cargo can be positioned deeper in the loaded position than would be the case with a horizontal orientation in the loaded position as the supporting unit is at least partially moveable into the pocket of the pocket wagon. In addition the inclination or inclined positioning affords a compacted loading option by virtue of making better use of the loading space between the main beam members of the rail vehicle.

The at least one supporting unit can be arranged stationarily relative to the carrying device, preferably being in one piece with the carrying device. The supporting unit can have a drive-on element which can be arranged pivotably on the supporting unit.

The carrying device can be moveable as a whole between the receiving position and the loaded position. The carrying device or at least the at least one supporting unit can be for example in the form of an inclined plane or in the form of struts arranged in a step-like configuration. In that case, it is advantageous if the carrying device in the receiving position can be supported by at least one support which can be removed, pulled in, or pivoted in, in such a way that it is possible to drive on to the supporting unit without any problem. The carrying device is set down by the hoisting unit on the pocket wagon in such a way that the at least one supporting unit is arranged partially in the pocket and can preferably be supported without using the support directly on the pocket wagon (for example with the raised end of the inclined plane or the highest strut of the step arrangement).

The at least one supporting device can be arranged to be moveable, preferably pivotable, for performing the movement between the receiving position and the loaded position, relative to the carrying device. That makes it possible in a way to change between the receiving position and the loaded position. The at least one supporting unit can be, for example, in the form of a flat carrying surface which is mounted pivotably at one end. The pivot axis extends in the transverse direction of the rail vehicle in the loaded position.

Preferably, in the case of a carrying device having an elongate carrying frame, one end of the at least one supporting unit can project beyond the longitudinal extent of the carrying frame. This has the advantage that, upon lowering of the carrying device on to the rail vehicle, in particular upon lowering into a pocket of a pocket wagon, the end of the supporting unit rests on an edge or an upper edge of the pocket and as a result the supporting unit, upon further lowering movement of the carrying device into the pocket, is automatically pivoted due to the lowering movement until the loaded position of the supporting unit is reached.

It is possible to provide a plurality of pivot mountings for the at least one supporting unit so that the at least one supporting unit can be arranged in various height positions and/or various longitudinal positions on the carrying device. The various height positions afford the option of adapting the position of the at least one supporting unit to the height of the cargo. The various longitudinal positions afford the option of supporting cargo items of differing lengths. In particular the at least one supporting unit can be so arranged that, when the carrying device is placed on the rail vehicle, no contact occurs in respect of the free end of the supporting unit with the rail vehicle, which would cause pivotal movement of the supporting unit.

The supporting unit can be anchored in the pivot mountings by means of a per se known bolt locking arrangement in which bolts extend from the supporting unit and engage into the pivot mountings.

Preferably the carrying devices are designed to be stackable. In that case, openings can be on the carrying frame, through which fixing elements can be introduced in carrying devices which are in mutually stacked relationship, in order to fix the stacked carrying devices relative to each other.

There can be a drive device for moving the at least one supporting unit. The drive device can be for example pneumatic or hydraulic, for example in the form of one or more piston-cylinder units, or electric.

Alternately, the at least one supporting unit can be freely moveable for performing the movement between the receiving position and the loaded position relative to the carrying device—optionally except for the action of a damping device—. By virtue of a lowering movement of the carrying device by means of the hoisting unit, after contacting of the free end of the supporting unit (that end being opposite to the pivot axis) or the carrying surface thereof with the rail vehicle (for example with the edge or the upper edge of the pocket of a pocket wagon), lifting of the free end occurs and thus pivotal movement of the supporting unit or the carrying surface thereof about the pivot axis.

The carrying device can have—preferably positively locking—fixing means for fixing the carrying device on the rail vehicle. In that respect, the fixing means can be arranged on the carrying frame, preferably at an end of the carrying frame. It is particularly preferable that at least two mutually spaced fixing means are arranged on the carrying frame. The fixing means are preferably in the form of ISO container mountings. That is particularly advantageous for the reason that rail vehicles like the pocket wagon are standard with complementary pins which can be positioned in ISO container mountings. If the cargo is in the form of a semitrailer it is advantageous if the kingpin of the semitrailer—as is known—can be introduced into an opening on the rail vehicle. For that purpose it is advantageous if the fixing means are arranged displaceably relative to the carrying device in order to avoid geometrical overdetermination.

The at least one supporting unit can be adapted to be variable in length. That affords an improved loading capability for larger cargo items.

It is possible to provide on the at least one supporting unit at least one contact surface which is preferably of a substantially convex configuration in order to permit a rolling movement of the at least one supporting unit on the rail vehicle or pocket wagon when the carrying device is lowered into the pocket of the pocket wagon. The at least one contact surface can have a receiving opening (for example in the form of a guide slot extending in the longitudinal direction), into which a pin arranged on the pocket wagon can be introduced. In this case the possibly convex contact surface has a slip-prevention means for limiting slippage of the carrying device relative to the rail vehicle in a direction transversely relative to the longitudinal direction. To limit slippage in the longitudinal direction it is possible to provide at least one abutment—preferably there can be two abutments arranged in spaced relationship in the longitudinal direction of the receiving opening—against which a pin arranged on the pocket wagon can be supported in the loaded condition of the carrying device. The slip-prevention means can be independent of the receiving opening at another location.

The at least one supporting unit can be fixed in differing positions relative to the carrying frame thereon—optionally moveably—. It is possible in that way to react in an extremely flexible fashion to differing heights of the cargo.

The carrying frame can be of an elongate configuration and at least one of its longitudinal sides has an opening at the height which permits opening of a door of a vehicle arranged on the at least one supporting unit.

The carrying device can have at least two supporting units which can be loaded with cargo independently of each other. That permits almost complete utilization of the cargo space available on the rail vehicle, with a single carrying device, on which for example two tractor units can be mounted (each in a respective one of the at least two supporting units).

The carrying device can be adapted to be drivable.

Protection is also requested for a method for loading a rail vehicle employing the liftable carrying device.

BRIEF DESCRIPTION OF THE DRAWINGS

Further advantages and details of the invention will be described by reference to the Figures and the related specific description. In the drawings:

FIGS. 1a-1d show a first embodiment of the invention in various views in the receiving position (without cargo), FIGS. 2a-2d show a second embodiment of the invention in various views in the receiving position (without cargo), FIGS. 3a-3d show the embodiment of FIG. 2 in the loaded position (without cargo), FIGS. 4a-4d show the embodiment of FIG. 2 in a different kind of configuration in the loaded position (without cargo), FIGS. 5a-5d show the embodiment of FIG. 2 in various views in the receiving position (with cargo), FIGS. 6a-6d show the embodiment of FIG. 2 in various views in the loaded position (with cargo), FIGS. 7a-7d show the embodiment of FIG. 1 in various views in the loaded position (with cargo), FIGS. 8a-8c show a further view of the embodiment of FIG. 2 in a different kind of configuration in the loaded position (with cargo), FIGS. 9a-9d show a third embodiment of the invention in various views in the receiving position (without cargo), FIGS. 10a-10d show a further embodiment of the invention.

DETAILED DESCRIPTION OF THE INVENTION

Figure 10B:
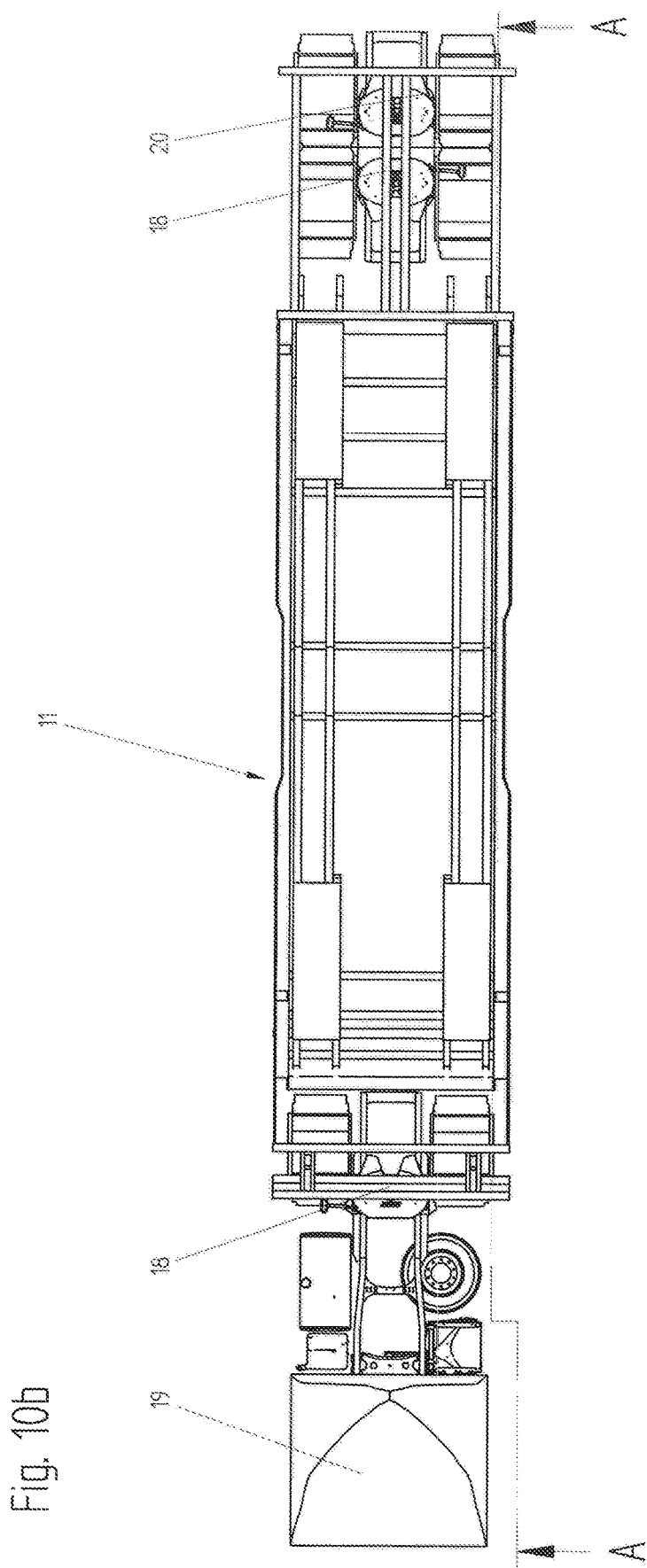
Figure 10D:
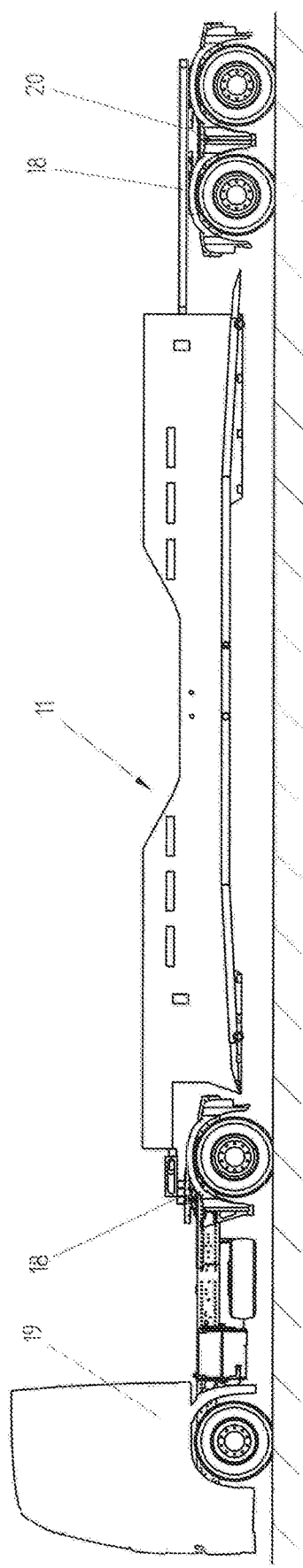

FIGS. 1a-1d show a first embodiment of a proposed liftable carrying device 1 in various views in the receiving position (without cargo 3). FIG. 1a shows a perspective view from above. In this case the supporting unit 4 is in the form of a plurality of struts which are respectively arranged in the region of an end of the carrying frame 8 which here is of an elongate configuration. The supporting unit 4 is arranged stationarily relative to the carrying device 1. The carrying device 1 shown here lies both with the side portions of the carrying frame 8 and also with the struts as support surfaces 6 on a terminal floor 7 (not shown here—see FIGS. 1c and 1d). In this embodiment the carrying device 1 has a side 9 of the carrying frame 8, that is adapted to be portion-wise pivotable. Unlike the illustrated arrangement, it would also be possible for the other end to be in the form of a pivotable side 9 of the carrying frame 8.

In this embodiment the carrying device 1 is so designed that it is possible to drive through it. It is suitable in particular for loading with a cargo 3 in the form of a semitrailer. Loading is effected in such a way that the tractor unit, together with the attached semitrailer, drives through the carrying device 1 until the semitrailer is arranged completely in the carrying device 1 on the supporting unit 4 thereof. Naturally, it is also possible for the semitrailer to be driven rearwards into the carrying device 1 by means of the tractor unit. In that case, the carrying device 1 does not have to be designed in such a way that it is possible to drive through it. After positioning of the semitrailer has been effected, the tractor unit is uncoupled and possibly parked separately on a further carrying device 1 according to the invention.

A hoisting unit can lift the carrying device 1 together with cargo 3 as a whole by way of the receiving pockets 5 and set it down on a rail vehicle 2 (not shown here). Preferably, the dimensioning of the carrying device 1 corresponds to the dimensioning of the loading region of the rail vehicle 2. The four gripping arms of the hoisting unit, at four different positions of the carrying device 1, are three respective receiving pockets 5, of which a respective one is used depending on the centre of gravity of the cargo 3.

For empty runs without cargo 3 on the carrying devices 1 the carrying devices 1 can be stacked one above the other. To be able to fix the stacked carrying devices 1 a respective carrying frame 8 of a carrying device 1 has openings 12 through which a fixing element can be fitted. A stacked arrangement of a plurality of carrying devices 1 makes it possible to save on rail vehicles 2 for empty transport runs.

At its longitudinal sides the carrying frame 8 has a respective opening 11 which permits opening of a door of a vehicle arranged on the supporting unit 4.

FIGS. 2a-2d show a second embodiment of the invention in various views in the receiving position (without cargo 3). In addition to the first embodiment, in this example, arranged in the region of the respective ends of the carrying device 1 are respective supporting units 4' in the form of carrying surfaces in the form of planks 14. The supporting units 4' or their planks 14 are arranged on the carrying device 1 pivotably about a respective pivot axis. The pivot axes extend through pivot mountings or mountings 13 arranged in the central region of the carrying device 1, in which respect it can be seen that a plurality of mountings 13 is available to permit different positions of the planks 14 (see FIG. 8). By virtue of the multiplicity of mountings 13 the supporting units 4' can be arranged at different height positions and/or at different longitudinal positions of the carrying device 1. Unlike the situation shown, a respective carrying surface can also be of a continuous configuration.

FIGS. 3a-3d show the embodiment of FIG. 2 in the loaded position (without cargo 3). The pivotable supporting units 4' in the form of planks 14 are respectively freely moveable between a receiving position for the cargo 3, in which the cargo 3 is oriented substantially horizontally, and a loaded position of the cargo 3, in which the cargo 3 is inclined. In the illustrated view the transport apparatus 1 is already in a rail vehicle 2 (not shown here) in the form of a pocket wagon. The carrying surfaces or planks 14 in the region of the ends of the carrying frame 8 are lifted and thus inclined by the pocket wagon.

FIGS. 4a-4d show the embodiment of FIG. 2 in a different kind of configuration in the loaded position (without cargo 3). In this example, other mountings 13 or mountings which are arranged higher on the carrying device 1 are used for the carrying surfaces, in comparison with FIG. 2. Accordingly the pivot axes for the pivotable supporting units 4' which are in the form of the carrying surfaces are correspondingly higher.

FIGS. 5a-5d show the embodiment of FIG. 2 in various views in the receiving position with cargo 3 in the form of two tractor units.

FIGS. 6a-6d show the embodiment of FIG. 2 in various views in the loaded position for cargo 3 in the form of two tractor units. In this view the supporting units 4' are disposed in their respective loaded position in which the respective cargo is inclined relative to the horizontal. The free ends of the supporting units 4' are respectively disposed on the rail vehicle 2 which is in the form of a pocket wagon. At its end the carrying device 1 has fixing means 10 for fixing the carrying device 1 on the rail vehicle 2. The fixing means 10 are in the form of ISO container mountings into which corresponding pins of the rail vehicle 2 engage.

FIGS. 7a-7d show the embodiment of FIG. 1 in various views in the loaded position with cargo 3 in the form of a semitrailer.

The detail B can be included in all embodiments. It illustrates a possible option in respect of floating mounting of the carrying device 1 on the rail vehicle 2. In the illustrated approximately C-shaped guide portion 16 of the fixing means 10, a receiving slide portion 17 can be displaced along the guide portion 16. That can compensate for adaptation to different length positions which arise due to mounting in the kingpin of the semitrailer. Unlike the situation illustrated, as an alternative to displaceability, it is possible to provide for pivotability of the fixing means 10 with a bolting action.

FIGS. 8a-8c show a further view of the embodiment of FIG. 2 in a different kind of configuration in the loaded position with cargo 3 in the form of a bus. In this example, in comparison with FIG. 2, other mountings 13 or mountings which are arranged higher on the carrying device 1 were used for the carrying surfaces. Accordingly the pivot axes for the carrying surfaces are correspondingly higher.

FIGS. 9a-9d show a third embodiment of the invention in various views in the receiving position (without cargo 3). In this embodiment the carrying device 1 or the supporting device 4 stationarily connected thereto is moveable as a whole between the receiving position and the loaded position. The carrying device 1 can be supported in the receiving position by supports 15 which can be introduced here. After lifting of the carrying device 1 by a hoisting mechanism the supports 15 are to be moved in.

FIGS. 10a-10d show a further embodiment of the invention in which the carrying device 1 is adapted to be drivable. For that purpose the carrying device can have at least one coupling means 18 for at least one axle provided with wheels or trailer bogie 20 and at least one coupling means for a tractor vehicle 19. Two coupling means for axles provided with wheels can be arranged at both ends of the carrying device 1 and a towing hitch for a vehicle.

FIGS. 11a through 15b show various views and detail illustrations of a further embodiment.

Figure 11A:
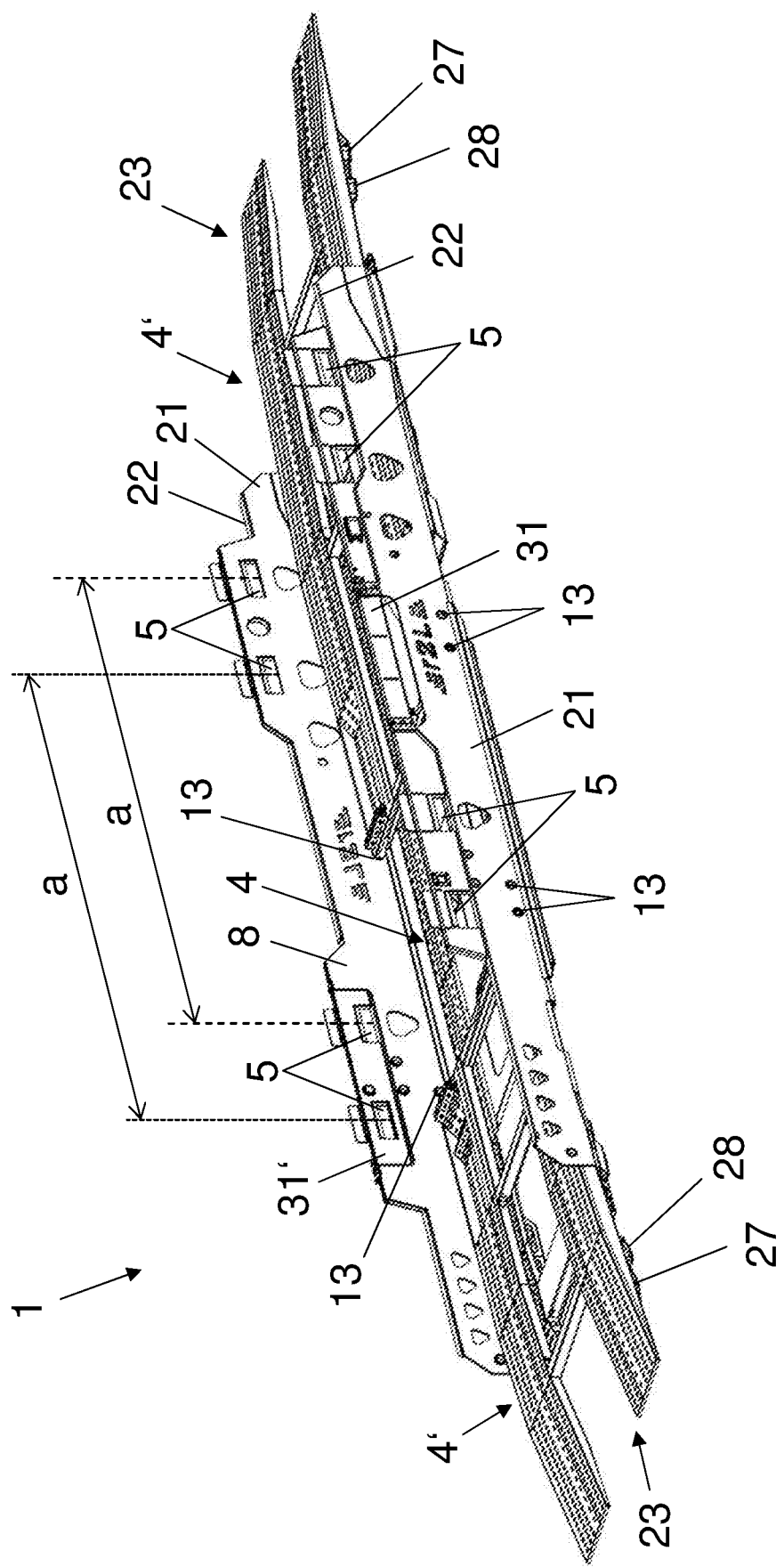
FIGS. 11a and 11b show perspective views of a further embodiment of the invention.

FIG. 11a shows a perspective view of a further embodiment of the invention. The longitudinal sides 21 of the carrying frame 8 are equipped in this example with stiffening elements 22 mounted at the outside of the longitudinal sides 21. One of the stiffening elements 22 extends along the entire length of the longitudinal side 21 and has a crank offset in the central region of the longitudinal side 21. The other longitudinal side 21 has three portions, namely two end portions and a central portion, and the stiffening element 22 in this case is of a bar-shaped configuration only in the two end portions. The central portion of the longitudinal side 21 is in the form of a pivotable door 31. When the door 31 is open it is possible to climb into and out of the vehicle placed on the carrying device 1.

The carrying device 1 is equipped with a total of three supporting units 4, 4'. One of the supporting units 4 is stationary relative to the carrying device 1 and in this embodiment is in one piece with the carrying device 1. The other two supporting units 4' are arranged in the carrying frame 8 pivotable at pivot mountings 13 respectively. For anchoring a supporting unit 4' in the mountings 13, bolts can be extended out of the supporting unit 4' and engage into the mountings 13 by actuation of a operating device, for example by pivoting a lever.

In this example two pairs of receiving pockets 5 are respectively in the longitudinal sides 21 of the carrying frame 8. Two of the receiving pockets 5 are arranged in a further door 31'. The respective spacing of the two receiving pockets 5 of a respective pair is about 4876 mm. The receiving pockets 5 arranged above the stiffening elements 22 are designed for gripping edges of a so-called spreader which can be mounted to a crane or a reach stacker.

In the end regions the supporting units 4' have drive-on elements 33 which include an inclination relative to the horizontal to make it easier to drive a vehicle on to the supporting unit 4'.

In addition, the supporting units 4' have slip-prevention means which are not visible in this view to limit slippage of the supporting units 4' on a pocket wagon.

Figure 11B:
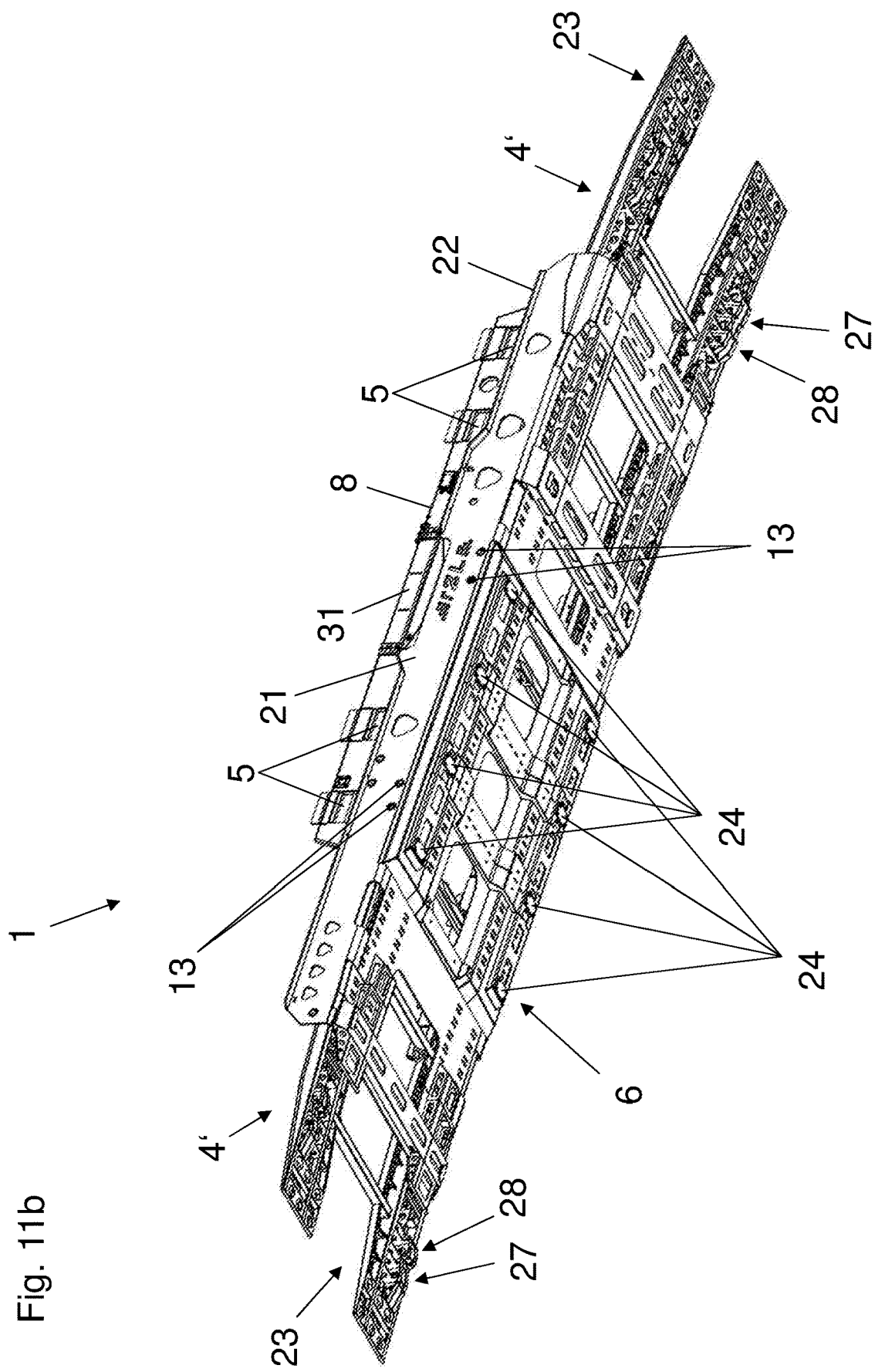

FIG. 11b shows a perspective view from below of the embodiment of FIG. 11a. It will be seen from this view that, in this embodiment, the support surfaces 6 of the carrying device 1 are equipped with friction-enhancing contact devices 24. This ensures, even when dealing with a smooth terminal floor 7, that the carrying device 1 can be driven on to, without in that case being displaced relative to the terminal floor 7.

Figure 12:
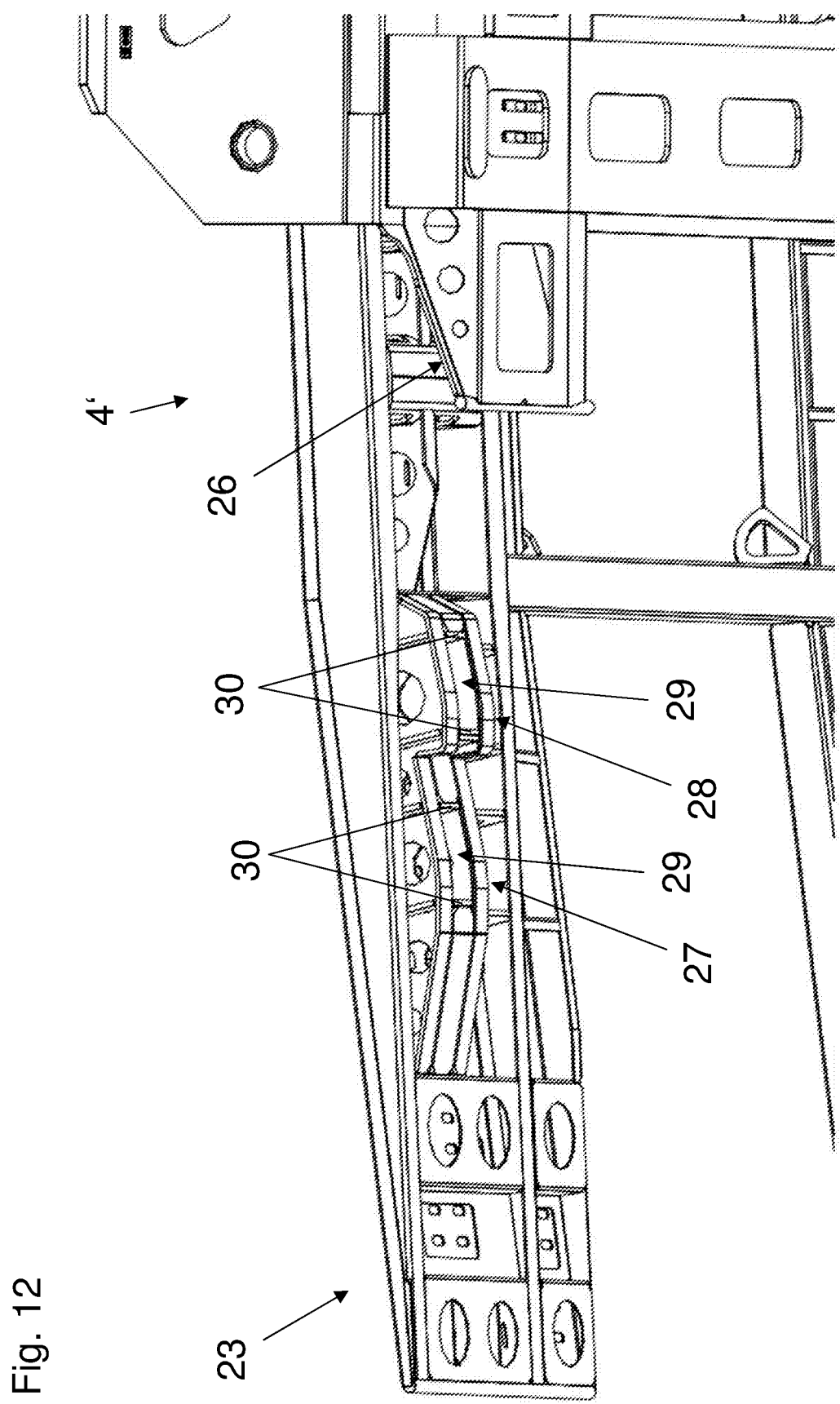
FIG. 12 shows a detail view of FIG. 11b, FIGS. 13a-13c show a side view illustrating a sequence of placement of the supporting unit of FIG. 12 on a pocket wagon.

FIG. 12 shows a perspective view from below of a detail of FIG. 11. It is possible to see here an end region of one of the supporting units 4' which are arranged pivotably on the carrying device 1 and which in this example includes two contact surfaces 27, 28 to permit support of the supporting units 4' on the rail vehicle 2 at two different positions. The contact surfaces 27, 28 are substantially convex in portion-wise fashion by a plurality of portions which extend straight, being arranged in mutually adjoining relationship at corresponding angles. That permits areal contact of the contact surfaces 27, 28 on a corresponding surface of a rail vehicle 2 into which the carrying device 1 is fitted, in different pivotal positions of the supporting unit 4'. In this arrangement the contact surfaces 27, 28 have receiving openings 29 into which a pin 32 (see FIG. 13a) arranged on the rail vehicle 2 can engage. In order very substantially to avoid longitudinal movements of the supporting unit 4' with respect to the rail vehicle 2, for example upon shunting coupling of the rail vehicle 2, the assembly has abutments 30 at which the pin 32 can be supported. The side walls of the receiving opening 29 form a slip-prevention means transversely relative to the longitudinal extent, the abutments 30 forming a slip-prevention means in the direction of the longitudinal extent. The receiving opening 29 can be in the form of an ISO container mounting.

FIGS. 13a through 13c show, by way of example, the procedure involved in mounting a carrying device 1 in a pocket 25 of a rail vehicle 2 in the form of a pocket wagon, as side views.

FIG. 13a shows an end region of the carrying device 1. In particular, it is possible to see an end region of a supporting unit 4' which has a first contact surface 27 and a second contact surface 28. The two contact surfaces 27, 28 each have a receiving opening 29 (not visible here). Included on the pocket wagon is a pin 32 which subsequently engages into the receiving opening 29.

In FIG. 13b the carrying device 1 is lowered to such an extent that the second contact surface 28 rests on a corresponding surface of the pocket wagon. The pin 32 engages through a receiving opening 29 (not visible in this view) to limit slippage of the supporting unit 4.

In FIG. 13c the carrying device 1 is lowered completely into the pocket 25 of the pocket wagon in which the carrying device 1 is supported with its support surface 6 in the pocket 25 of the pocket wagon. By virtue of a substantially convex configuration of the second contact surface 28, the latter is also disposed in this pivotal position of the supporting unit 4 on the pocket wagon. The stiffening element 28 extends above the upper edge 33 in the region of the pocket 25 of the pocket wagon.

Figure 14:
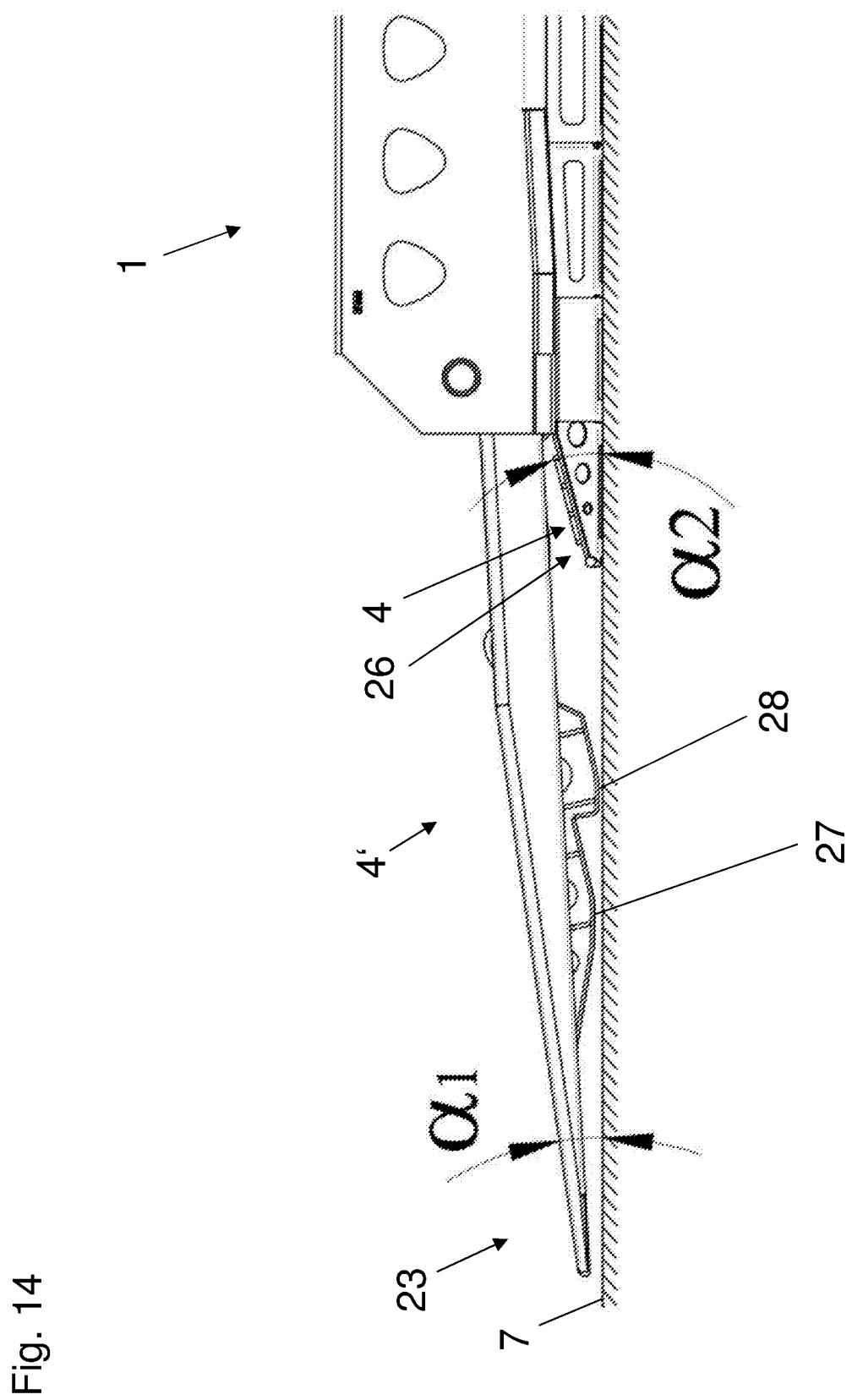
FIG. 14 shows a side view of a portion of the supporting unit of FIG. 12, and FIGS. 15a and 15b show views of the embodiment of FIG. 11 in a pocket wagon.

FIG. 14 shows the carrying device 1 of FIG. 11a which, in this view, is set down on a terminal floor 14. It is possible here to see the end regions of two of the total of three supporting units 4, 4' of the carrying device 1. The supporting unit 4' mounted pivotably to the carrying device 1 has a first drive-on element 23. In the condition of the carrying device 1 on the terminal floor 7, being set down as shown, the surface which can be driven on of that first drive-on element 23 has an angle of inclination $\alpha_1$ in relation to the substantially horizontally extending terminal floor 7. The angle of inclination $\alpha_1$ in this example is between about 7.5 degrees and 8.3 degrees. The supporting unit 4, which is stationary relative to the carrying device 1 and formed in one piece with the carrying device 1, likewise has a second drive-on element 26 which is at an angle of inclination $\alpha_2$ in relation to the substantially horizontally extending terminal floor 7. The angle of inclination $\alpha_2$ in this example is about 15 degrees.

Figure 15A:
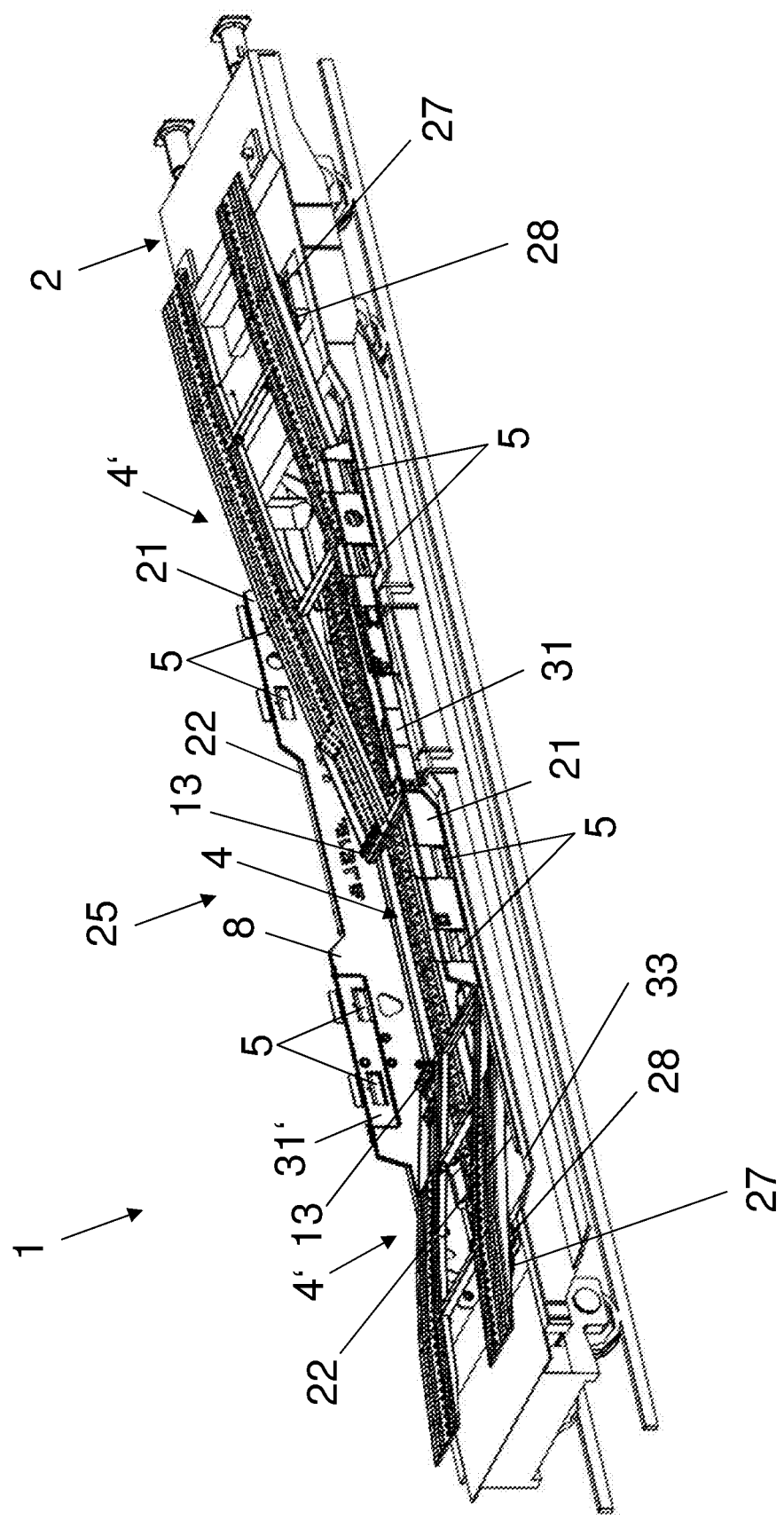
Figure 15B:
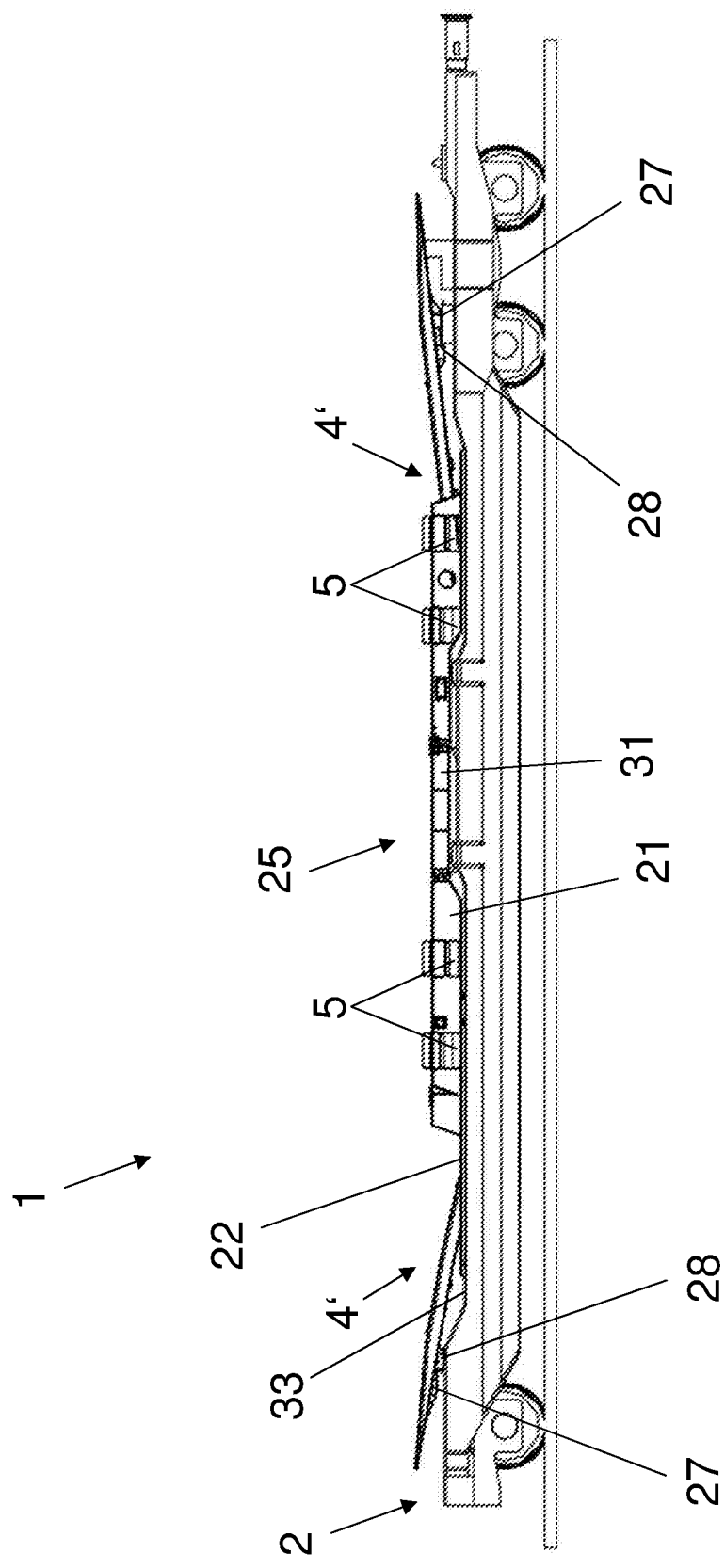

FIG. 15a shows a perspective view from above of a rail vehicle 2 which is in the form of a pocket wagon, and in the pocket 25 of which the carrying device 1 as shown in FIGS. 11a and 11b is carried, while FIG. 15b shows a side view of this arrangement. The supporting units 4' are in the loaded position (without cargo 3).

It will be seen from FIG. 15b that the two supporting units 4' arranged pivotably on the carrying device 1 are respectively equipped at their free end regions with a substantially convex first contact surface 27 and second contact surface 28. The end region of the supporting unit 4' which is at the left in the view is supported on the pocket wagon by way of its second contact surface 28 and the end region of the supporting unit 4' which is at the right in the view is supported on the pocket wagon by way of its first contact surface 27.

LIST OF REFERENCES 1 carrying device
2 rail vehicle 3 cargo
4, 4' supporting unit
5 receiving pocket
6 support surface of the carrying device
7 terminal floor
8 carrying frame
9 side of the carrying frame
10 fixing means
11 opening
12 opening
13 mounting for supporting unit
14 plank
15 support means
16 guide portion
17 receiving slide portion
18 coupling means
19 tractor vehicle
20 trailer bogie unit
21 longitudinal side of the carrying frame
22 stiffening element
23 first drive-on element
24 contact device
25 pocket of a pocket wagon
26 second drive-on element
27 first contact surface of the supporting unit
28 second contact surface of the supporting unit
29 receiving opening
30 abutment
31, 31' door in the longitudinal side of the carrying frame
32 pin
33 upper edge of the pocket of a pocket wagon
a spacing between two receiving pockets
$\alpha_1$ angle of inclination of a first drive-on element
$\alpha_2$ angle of inclination of a second drive-on element

The invention claimed is:

1. A liftable carrying device for loading a rail vehicle with cargo by a hoisting unit, said carrying device comprising:
    a carrying frame,
    a supporting unit arranged on the carrying frame for supporting the cargo,
    receiving pockets of the carrying frame for receiving the hoisting unit,
    support surfaces of the carrying frame for directly supporting the carrying device on a terminal floor, and
    a pivoting structure for moving the supporting unit between a receiving position for receiving the cargo, in which the cargo is oriented substantially horizontally, and a loaded position for supporting the cargo, in which the cargo is inclined,
    wherein the receiving pockets are arranged spaced vertically relative to the supporting unit above the supporting unit in the receiving position of the supporting unit in which the supporting unit is oriented substantially horizontally.

2. The carrying device as set forth in claim 1, wherein the supporting unit is configured to be directly driven on to when the carrying device is placed on the terminal floor.

3. The carrying device as set forth in claim 1, wherein the receiving pockets and the support surfaces are arranged on the carrying frame.

4. The carrying device as set forth in claim 3, wherein the receiving pockets are arranged in an upper end region of the carrying frame.

5. The carrying device as set forth in claim 3, wherein the carrying frame is of an elongate configuration and includes two longitudinal sides.

6. The carrying device as set forth in claim 5, wherein the receiving pockets are arranged in an upper end region of the longitudinal sides, wherein the receiving pockets are arranged in the regions of respective longitudinal ends of the longitudinal sides.

7. The carrying device as set forth in claim 5, wherein an end of the supporting unit extends beyond a longitudinal extent of the carrying frame.

8. The carrying device as set forth in claim 5, wherein an internal width between the longitudinal sides of the carrying frame is at least about 2600 mm.

9. The carrying device as set forth in claim 3, wherein the carrying frame is openable through a pivotable door formed along a portion of at least one of its sides.

10. The carrying device as set forth in claim 9, wherein the carrying frame is openable at an end of the carrying frame.

11. The carrying device as set forth in claim 1, wherein the supporting unit comprises at least one contact surface which has a substantially convex configuration.

12. The carrying device as set forth in claim 11, wherein the at least one contact surface has a receiving opening, in the form of a guide slot extending in the longitudinal direction receivable of a pin, wherein at least one abutment is adjacent to the receiving opening configured to limit a movement of the carrying device in the longitudinal direction.

13. The carrying device as set forth in claim 1, wherein the supporting unit is in the form of a carrying surface or in the form of a plurality of struts.

14. The carrying device as set forth in claim 1, wherein the carrying device is moveable as a whole between the receiving position and the loaded position.

15. The carrying device as set forth in claim 1, wherein the supporting unit is stationary relative to the carrying frame.

16. The carrying device as set forth in claim 1, wherein the supporting unit is pivotable, relative to the carrying frame, to perform the movement between the receiving position and the loaded position.

17. The carrying device as set forth in claim 16, further comprising a drive device for moving the supporting unit.

18. The carrying device as set forth in claim 16, wherein the supporting unit is freely moveable relative to the carrying frame except for an action of a damping device for performing the movement between the receiving position and the loaded position.

19. A liftable carrying device for loading a rail vehicle with cargo by a hoisting unit, said carrying device comprising:
    a carrying frame,
    a supporting unit arranged on the carrying frame for supporting the cargo,
    receiving pockets of the carrying frame for receiving the hoisting unit,
    support surfaces of the carrying frame for directly supporting the carrying device on a terminal floor, and
    a fixing means arranged on the carrying frame for fixing the carrying device onto another object,
    wherein the carrying frame has an elongate configuration and a plurality of longitudinal sides, with at least one of the longitudinal sides having an opening.

20. A method for loading a rail vehicle, with cargo by a hoisting unit, employing the liftable carrying device as set forth in claim 1, the method comprising:
    placing the carrying device directly on a terminal floor via the support surfaces, loading the supporting unit of the carrying device with cargo in a receiving position of the supporting unit, wherein in the receiving position the cargo is oriented substantially horizontally, lifting the carrying device together with the cargo by the hoisting unit via the receiving pockets, setting down the carrying device together with the cargo on the rail vehicle by the hoisting unit, wherein the supporting unit is moved into a loaded position for the cargo, in which the cargo is inclined.

21. The method as set forth in claim 20, wherein the hoisting unit has gripper edges or grabs engaging into the receiving pockets during said lifting.

22. The method as set forth in claim 20, wherein said setting down the carrying device together with the cargo on the rail vehicle by the hoisting unit is performed from above into a pocket of a rail vehicle provided in the form of a pocket wagon.

* * * * *